US011982602B2

(12) United States Patent
Kobayashi et al.

(10) Patent No.: US 11,982,602 B2
(45) Date of Patent: May 14, 2024

(54) FLUIDIC DEVICE, SYSTEM, AND MIXING METHOD

(71) Applicant: NIKON CORPORATION, Tokyo (JP)

(72) Inventors: Ryo Kobayashi, Kawasaki (JP); Hirofumi Shiono, Fujisawa (JP)

(73) Assignee: NIKON CORPORATION, Tokyo (JP)

( * ) Notice: Subject to any disclaimer, the term of this patent is extended or adjusted under 35 U.S.C. 154(b) by 547 days.

(21) Appl. No.: 17/256,151

(22) PCT Filed: Jun. 29, 2018

(86) PCT No.: PCT/JP2018/024945
§ 371 (c)(1),
(2) Date: Jul. 19, 2021

(87) PCT Pub. No.: WO2020/003538
PCT Pub. Date: Jan. 2, 2020

(65) Prior Publication Data
US 2021/0348992 A1 Nov. 11, 2021

(51) Int. Cl.
*G01N 1/38* (2006.01)
*B01F 33/301* (2022.01)
*G01N 35/08* (2006.01)

(52) U.S. Cl.
CPC ........... *G01N 1/38* (2013.01); *B01F 33/3017* (2022.01); *G01N 35/085* (2013.01); *G01N 2001/383* (2013.01)

(58) Field of Classification Search
CPC .. G01N 1/38; G01N 35/085; G01N 2001/383; B01F 33/3017
See application file for complete search history.

(56) References Cited

U.S. PATENT DOCUMENTS

| 2006/0160206 A1* | 7/2006 | Holmquist | ....... G01N 35/00029 435/287.2 |
| 2016/0199796 A1* | 7/2016 | Ichiki | ..................... B01F 33/30 366/192 |
| 2019/0099752 A1* | 4/2019 | Ichiki | ..................... G01N 35/08 |

FOREIGN PATENT DOCUMENTS

| EP | 3051293 A1 | 8/2016 |
| WO | WO 2015/046263 A1 | 4/2015 |

(Continued)

OTHER PUBLICATIONS

Notice of Reasons for Rejection dated Jan. 11, 2022 for Japanese Patent Application No. 2020-527165; with English translation, 8 pages.

(Continued)

*Primary Examiner* — Jill A Warden
*Assistant Examiner* — Alex Ramirez
(74) *Attorney, Agent, or Firm* — Squire Patton Boggs (US) LLP

(57) ABSTRACT

The present invention provides a fluidic device in which solutions of different concentrations can be easily obtained. The fluidic device includes: a first substrate and a second substrate which are stacked in a thickness direction; an undiluted solution introduction flow path which has an undiluted solution introduction port and which is constituted of a groove part provided on at least one of the first substrate and the second substrate; a first circulation flow path which is constituted of a groove part having an annular shape and having a shared part that shares part of a flow path with the undiluted solution introduction flow path and a non-shared part which is not shared with the undiluted solution introduction flow path and which is connected to a diluting solution introduction port; a second circulation flow path which is provided independently of the first circulation flow path and which is constituted of a groove part having an annular shape and having a shared part that shares some flow path with the undiluted solution introduction flow path and a non-shared part which is not shared with the undiluted solution introduction flow path and which is connected to a diluting solution introduction port; and/or a third circulation flow path which is constituted of a groove part having an annular shape and having a shared flow path that shares part of a flow path with the first circulation flow path and a non-shared flow path which is not shared with the first (Continued)

circulation flow path and which is connected to a diluting solution introduction port, wherein the undiluted solution introduction flow path includes a valve at both ends of the shared part.

17 Claims, 14 Drawing Sheets

(56) References Cited

FOREIGN PATENT DOCUMENTS

| WO | WO-2015046263 A1 * | 4/2015 | ......... B01F 13/0059 |
| WO | WO 2017/213123 A1 | 12/2017 | |
| WO | WO-2017213123 A1 * | 12/2017 | ............ B01L 3/5027 |

OTHER PUBLICATIONS

International Search Report for International Application No. PCT/JP2018/024945 dated Oct. 2, 2018; with English translation, 3 pages.

Written Opinion of the International Searching Authority for International Application No. PCT/JP2018/024945 dated Oct. 2, 2018; with English translation, 13 pages.

Hong, et al: "A nanoliter-scale nucleic acid processor with parallel architecture", Nature Biotechnology Letters; Apr. 2004 (online Mar. 14, 2004); vol. 22(4), pp. 435-439.

* cited by examiner

FLUIDIC DEVICE, SYSTEM, AND MIXING METHOD

CROSS-REFERENCE

This application is a 35 USC 371 national phase filing of PCT/JP2018/024945, filed Jun. 29, 2018.

TECHNICAL FIELD

The present invention relates to a fluidic device, a system, and a mixing method.

BACKGROUND

In recent years, attention has been focused on development or the like of μ-TAS (Micro-Total Analysis Systems) aiming at speeding-up, increasing the efficiency, and integration of tests in the field of in-vitro diagnostics or ultra-miniaturization of testing equipment, and active researches have been conducted worldwide.

The μ-TAS are superior to conventional testing equipment in that the μ-TAS can perform measurement and analysis with a small amount of sample, are portable, are disposable at low cost, and the like.

Further, attention has been attracted as a highly useful method when using expensive reagents or when testing a small amount of multiple samples.

A device including a flow path and a pump arranged on the flow path has been reported as a component of μ-TAS (Non-Patent Document 1). In such a device, a plurality of solutions are injected into the flow path, and by operating the pump, the plurality of solutions are mixed in the flow path.

RELATED ART DOCUMENTS

Non-Patent Document

[Non Patent Document 1] Jong Wook Hong, Vincent Studer, Giao Hang, W French Anderson and Stephen R Quake, Nature Biotechnology 22, 435-439 (2004)

SUMMARY OF INVENTION

According to a first aspect of the present invention, there is provided a fluidic device including: a first substrate and a second substrate which are stacked in a thickness direction; a first flow path which is constituted of a groove part along a direction parallel to a joint surface between the first substrate and the second substrate by being provided on one of the first substrate and the second substrate and being covered by another of the first substrate and the second substrate; and a plurality of second flow paths which are provided independently of each other and each of which is constituted of a groove part having an annular shape and having a shared part that shares part of the first flow path with the first flow path and a non-shared part which is not shared with the first flow path, wherein a volume of the shared part and a volume of the non-shared part in each of the plurality of second flow paths are set based on a volume ratio of the shared part and the non-shared part that is set for each of the second flow paths.

According to a second aspect of the present invention, a system is provided including: the fluidic device according to the first aspect of the present invention; and a supply part that is able to supply a force which deforms a valve that adjusts a flow of fluid in the flow path independently for each valve when set in the fluidic device.

According to a third aspect of the present invention, a system is provided including: the fluidic device according to the first aspect of the present invention; and a second supply part that is able to supply a force which collectively deforms drive valves arranged on a straight line over the plurality of second flow paths via a supply path arranged along the straight line.

According to a fourth aspect of the present invention, a mixing method is provided in which a first solution and a second solution are mixed using a fluidic device having at least two circulation flow paths that share part of a flow path as a shared part, the method including: mixing the first solution and the second solution in a first circulation flow path that includes the shared part and causing the first solution to be a solution having a first concentration; separating the shared part having the first solution having the first concentration from the first circulation flow path and forming a second circulation flow path by connecting the shared part to a non-shared part that is not shared with the first circulation flow path and that has the second solution; and mixing the second solution with the first solution having the first concentration in the second circulation flow path and causing the first solution to be a solution having a second concentration that is smaller than the first concentration.

BRIEF DESCRIPTION OF THE DRAWINGS

FIG. 9 is a cross-sectional view of a base material 5 taken along a line C-C in

FIG. 7.

DESCRIPTION OF EMBODIMENTS

Figure 1:
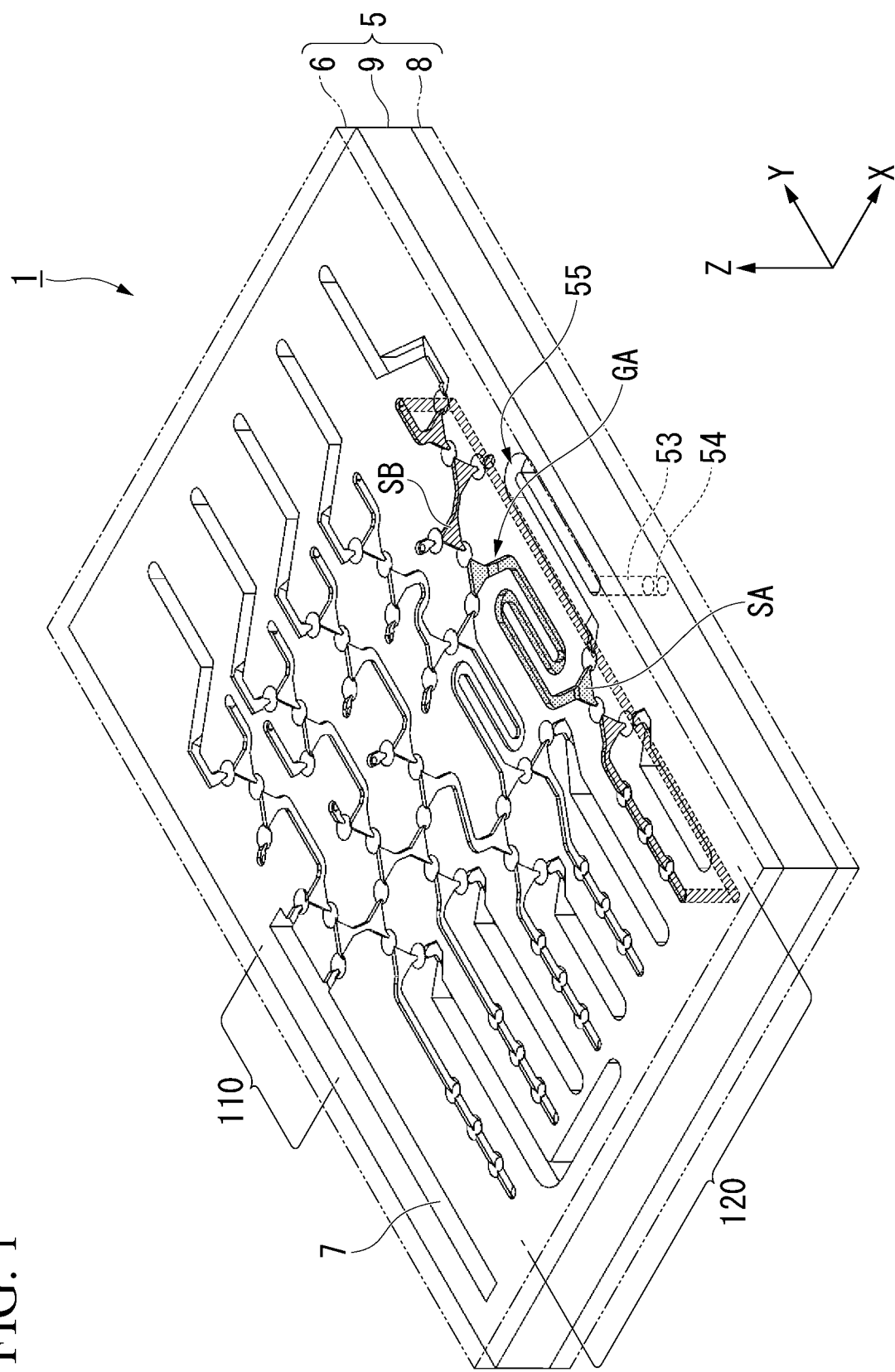
FIG. 1 is an external perspective view schematically showing a fluidic device according to an embodiment.

Hereinafter, embodiments of a fluidic device, a system, and a mixing method of the present invention will be described with reference to FIG. 1 to FIG. 19. In the drawings used in the following description, in order to make the features easy to understand, in some cases, the featured parts may be enlarged for convenience, and the dimensional ratio or the like of components may not be the same as the actual one.

[First Embodiment of Fluidic Device 1]

Figure 2:
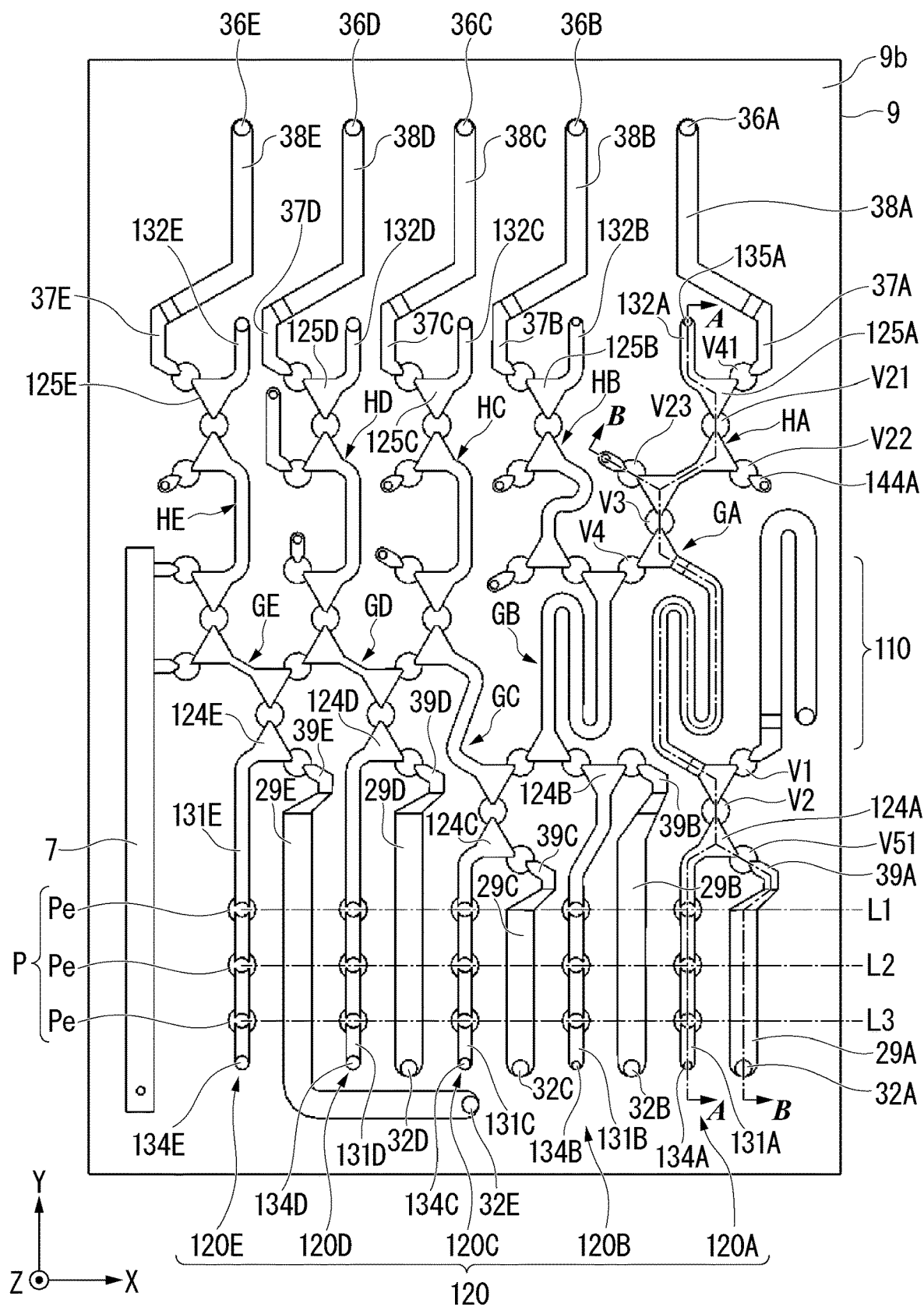
FIG. 2 is a plan view schematically showing the fluidic device according to the embodiment.
Figure 3:
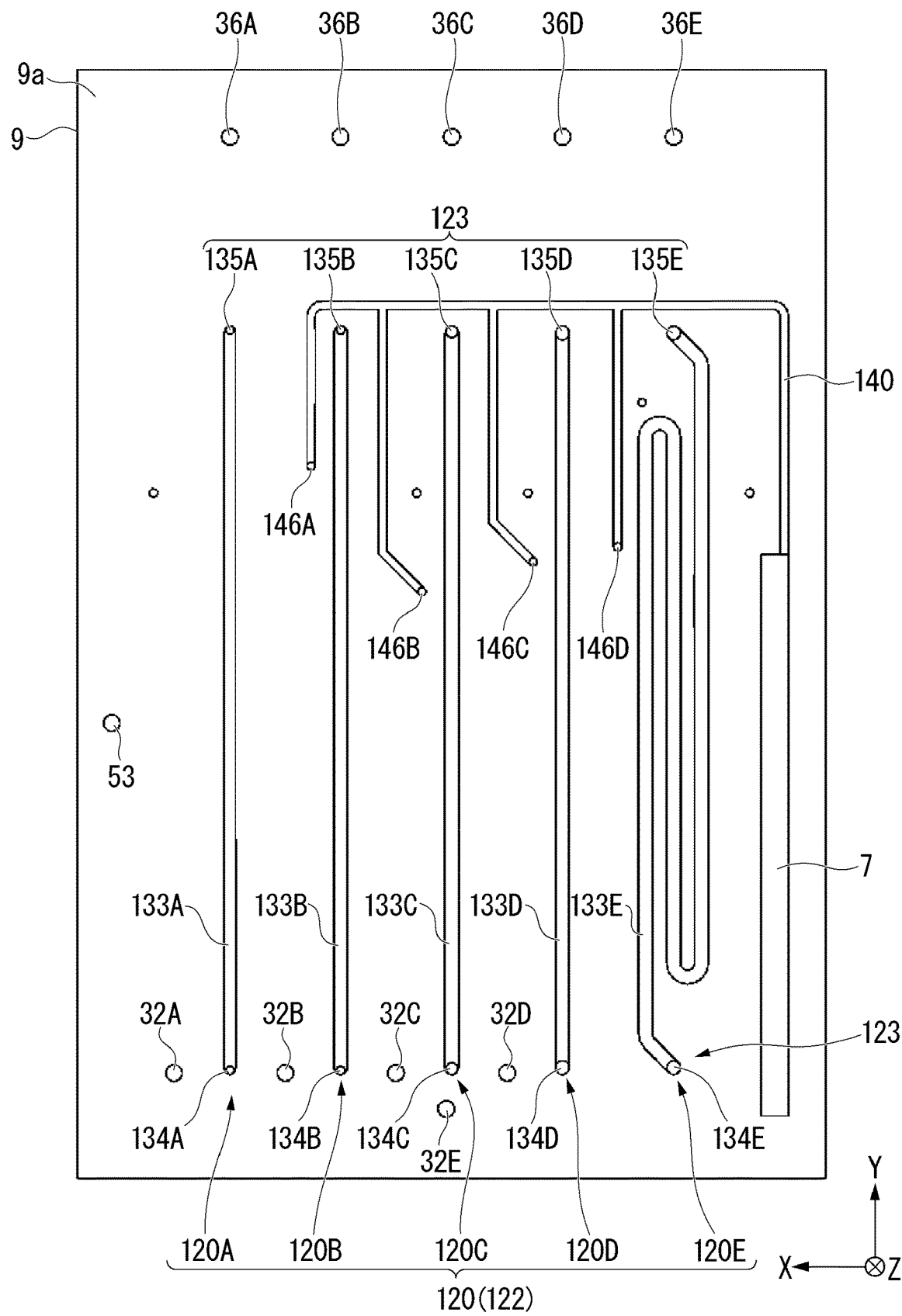
FIG. 3 is a lower surface view schematically showing the fluidic device according to the embodiment.
Figure 4:
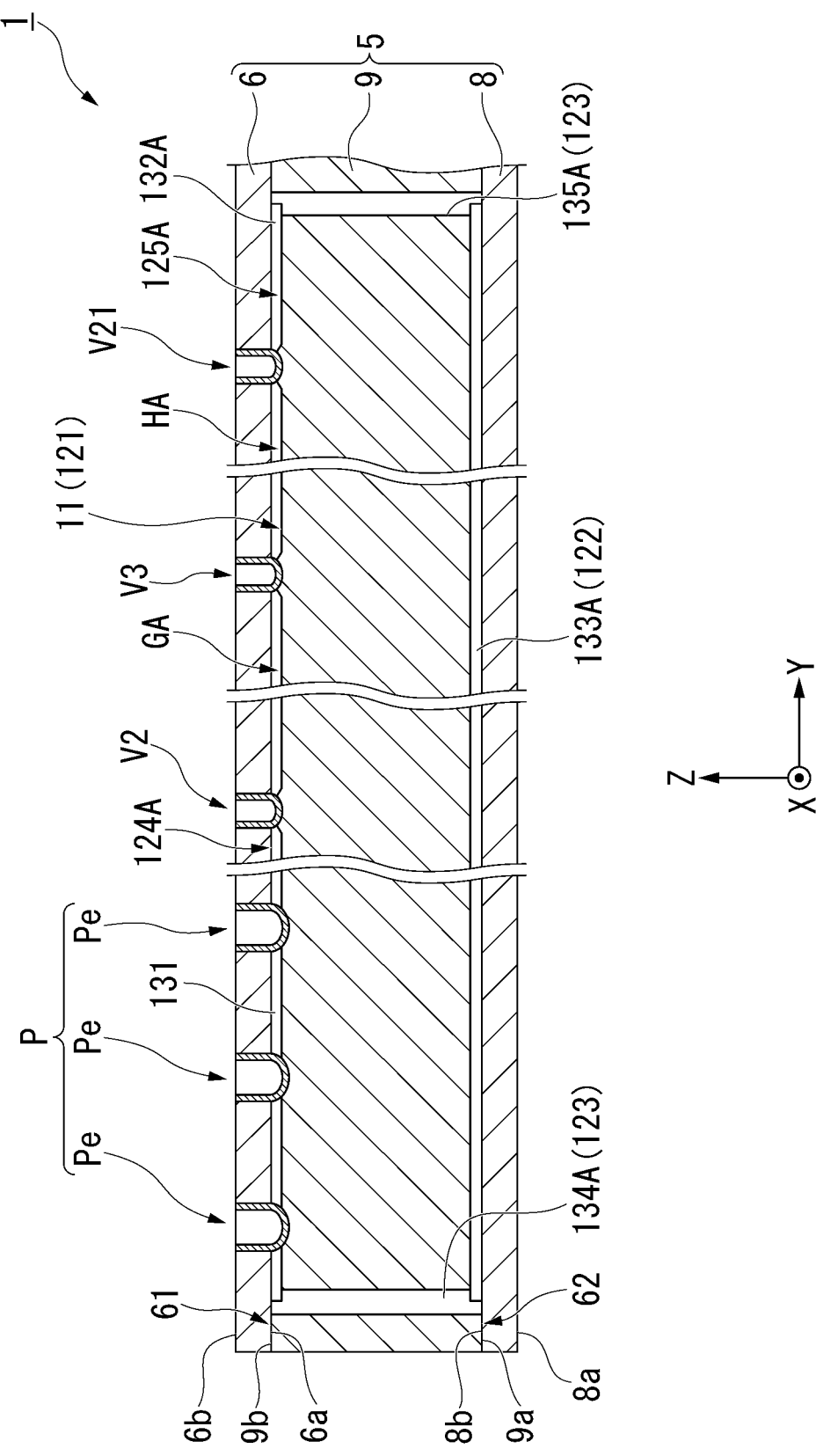
FIG. 4 is a cross-sectional view taken along a line A-A in FIG. 2.
Figure 5:
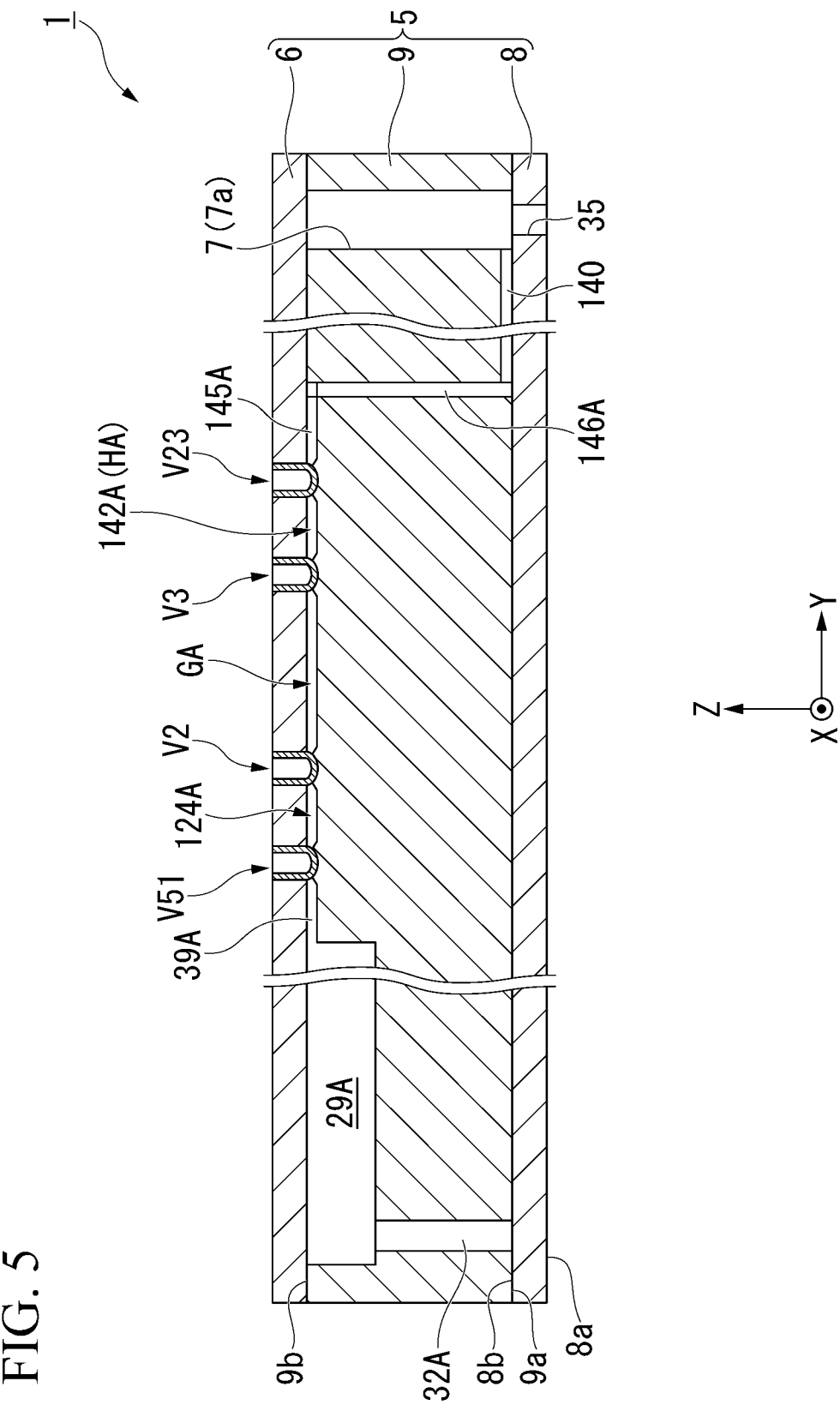
FIG. 5 is a cross-sectional view taken along a line B-B in FIG. 2.

FIG. 1 is an external perspective view schematically showing a fluidic device 1 according to a first embodiment. FIG. 2 is a plan view schematically showing an example of a flow path that is provided on an upper surface side (+Z side) of the fluidic device 1. FIG. 3 is a lower surface view schematically showing an example of a flow path that is provided on a lower surface side (−Z side) of the fluidic device 1. FIG. 2 and FIG. 3 are shown in a state where each part arranged on the lower side is seen through a transparent upper plate 6. FIG. 4 is a cross-sectional view taken along a line A-A in FIG. 2. FIG. 5 is a cross-sectional view taken along a line B-B in FIG. 2.

The fluidic device 1 of the present embodiment includes, as an example, a device that detects a sample substance to be detected included in a specimen sample by an immune reaction, an enzymatic reaction, and the like. The sample substance is, for example, a biomolecule such as nucleic acid, DNA, RNA, peptides, proteins, or extracellular endoplasmic reticulum.

As shown in FIG. 1, the fluidic device 1 includes a base material 5. The base material 5 has three substrates (a first substrate 6, a second substrate 9, and a third substrate 8) stacked in a thickness direction. The first substrate 6, the second substrate 9, and the third substrate 8 of the present embodiment are constituted of a resin material. Examples of the resin material that constitutes the first substrate 6, the second substrate 9, and the third substrate 8 include polypropylene, polycarbonate, and the like. Further, in the present embodiment, the first base material 6 and the third base material 8 are constituted of a transparent material. The material that constitutes the first base material 6, the third base material 8, and the second base material 9 is not limited.

In the following description, it is assumed that each of the first substrate 6, the second substrate 9, and the third substrate 8 is arranged along a horizontal plane to have a substantially rectangular plate shape in a S plane view, the first substrate 6 is arranged above the second substrate 9, and the third substrate 8 is arranged below the second substrate 9. However, this only defines a horizontal direction and a vertical direction for convenience of explanation and does not limit the orientation when the fluidic device 1 according to the present embodiment is used.

Further, in the following description, it is assumed that a long side direction of the first substrate 6, the second substrate 9, and the third substrate 8 is a Y direction, a short side direction is an X direction, and the lamination direction that is orthogonal to the X direction and the Y direction is a Z direction.

The first base material 6 has an upper surface 6b and a lower surface 6a. The second base material 9 has an upper surface 9b and a lower surface 9a. Similarly, the third base material 8 has an upper surface 8b and a lower surface 8a.

The lower surface 6a of the first base material 6 faces and is in contact with the upper surface 9b of the second base material 9 in the lamination direction. The lower surface 6a of the first base material 6 and the upper surface 9b of the second base material 9 are joined to each other by a joint means such as adhesion. The lower surface 6a of the first base material 6 and the upper surface 9b of the second base material 9 constitute a first boundary surface (joint surface) 61. That is, the first base material 6 and the second base material 9 are joined together at the first boundary surface 61.

Similarly, the upper surface 8b of the third base material 8 faces and is in contact with the lower surface 9a of the second base material 9 in the lamination direction. The upper surface 8b of the third base material 8 and the lower surface 9a of the second base material 9 are joined to each other by a joint means such as adhesion. The upper surface 8b of the third base material 8 and the lower surface 9a of the second base material 9 constitute a second boundary surface (joint surface) 62. That is, the second base material 9 and the third base material 8 are joined together at the second boundary surface 62.

As shown in FIG. 4 and FIG. 5, a flow path 11, a reservoir 29A, an injection hole 32A, a waste liquid tank 7, an air hole 35, a supply path (diluting solution introduction port) 39A, valves V1 to V16, V21 to V35, V41 to V45, and V51 to V55, and a pump P are provided on the base material 5.

The waste liquid tank 7 is provided on the base material 5 in order to discard a solution in the flow path 11. The waste liquid tank 7 is formed in a space by an inner wall surface of a penetration hole 7a that penetrates through the second substrate 9, the lower surface 6a of the first substrate 6, and the upper surface 8b of the third substrate 8. As shown in FIG. 1 and FIG. 2, the waste liquid tank 7 is formed to extend in the Y direction. The waste liquid tank 7 is arranged in the vicinity of an end edge on the −X side in the second substrate 9.

As shown in FIG. 5, the air hole 35 is provided to penetrate through the third substrate 8 in the Z direction. The air hole 35 is arranged at a position in communication with the waste liquid tank 7.

As shown in FIG. 1 to FIG. 4, the flow path 11 includes a first flow path (undiluted solution introduction flow path) 110 constituted of a groove part along the X direction and a plurality (five in FIG. 1 to FIG. 3) of second flow paths (first circulation flow paths) 120A to 120E (appropriately collectively referred to as a second flow path 120) provided along the X direction independently of each other. The term "the groove part is along the X direction" means that a straight line that connects together both ends in the length of the groove part is substantially parallel to the X direction. In the present embodiment, one flow path among the second flow paths 120A to 120E constitutes a first circulation flow path, and another flow path constitutes a second circulation flow path.

Figure 6:
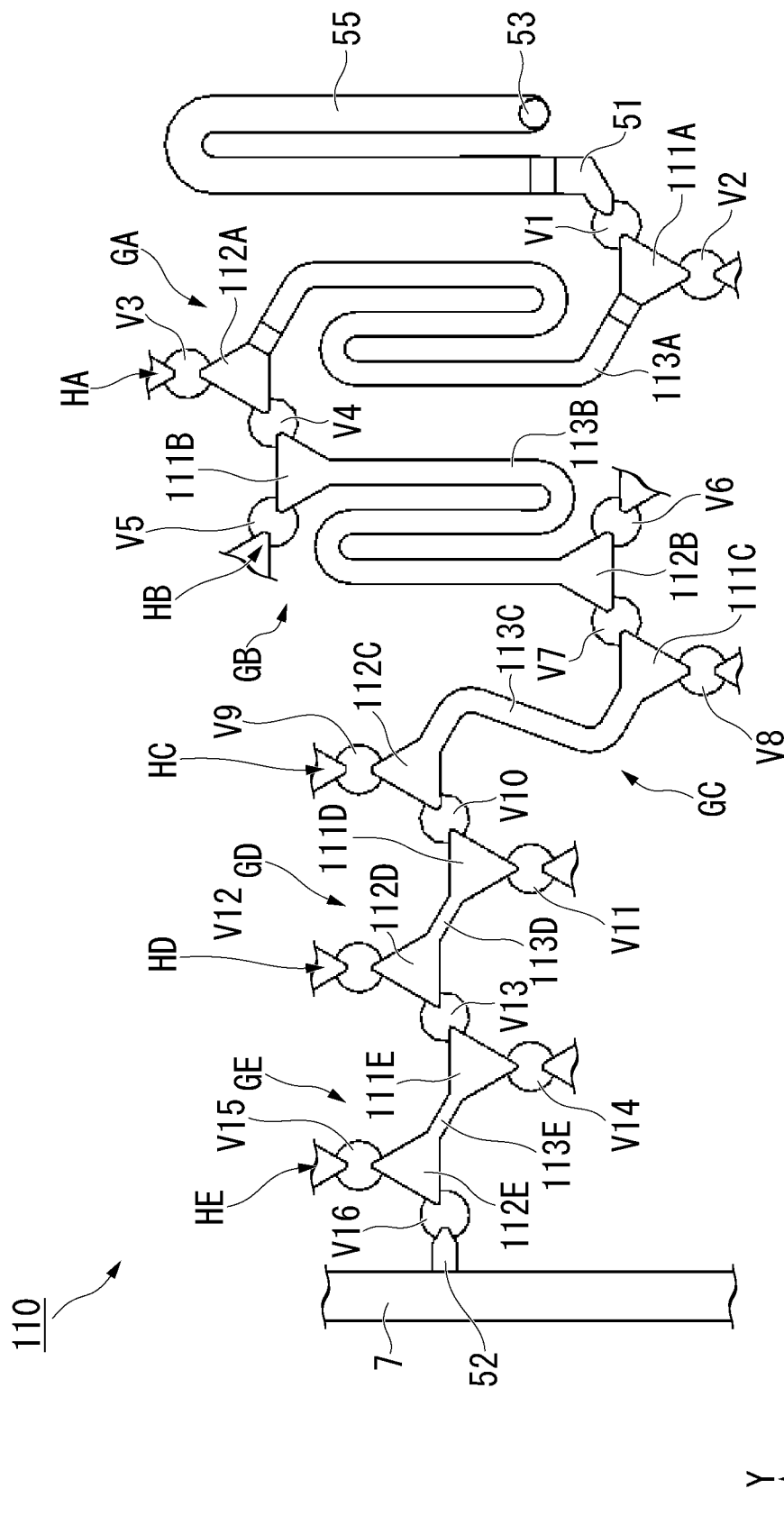
FIG. 6 is a partially enlarged plan view of a first flow path 110 according to the embodiment.

FIG. 6 is a partially enlarged plan view of the first flow path 110.

The first flow path 110 is constituted of a groove part that is provided on the upper surface 9b of the second substrate 9 and that is formed by being covered by the first substrate 6. The first flow path 110 includes: a plurality of quantification parts GA to GE arranged in the X direction so as to correspond to the plurality of second flow paths 120A to 120E; an introduction path (undiluted solution introduction port) 51; and a discharge path 52.

Since the quantification parts GA to GE have similar components, the quantification part GA is described below as a representative (with respect to components in the quantification parts GB to GE that correspond to the quantification part GA, a last symbol A of a reference sign is indicated as B to E).

The quantification part GA includes merging/branching portions 111A and 112A having a substantially equilateral triangle shape and a connection portion 113A. The merging/branching portions GB11 and GB12 are spaces including an upper surface and a bottom surface having a substantially equilateral triangle shape. Here, the substantially equilateral triangle shape means that each of the longest three sides forms 60 degrees. The merging/branching portions 111A and 112A are formed of a recess that is surrounded by a contour which is parallel to line segments connecting together apex positions (hereinafter, simply referred to as apex positions) of an equilateral triangle in a plan view (a lamination direction view (a thickness direction view of the second substrate 9)) and which is offset from the line segments by a predetermined distance to an inward which is a direction in which the area of the equilateral triangle is decreased.

The merging/branching portions 111A and 112A in the present embodiment include: an upper surface and a bottom surface having an equilateral triangle shape parallel to the upper surface 9b of the second substrate 9; and a side surface that is orthogonal to the upper surface and the bottom surface. Accordingly, the contour of the merging/branching portions 111A and 112A in a plan view is formed of a ridge line at which the upper surface 9b of the second substrate 9 intersects the side surface.

The upper surface and the bottom surface that constitute the merging/branching portions 111A and 112A are equilateral triangles having the same size and completely overlap each other in the lamination direction view. A valve that adjusts the flow of fluid in the flow path 11 is provided at positions of at least two apexes of the equilateral triangle (details will be described later).

The upper surface and the bottom surface that constitute the merging/branching portions 111A and 112A may have a configuration in which the upper surface is an equilateral triangle which is larger than that of the bottom surface, and the small equilateral triangle which is the bottom surface is arranged inside the large equilateral triangle which is the upper surface in the lamination direction view. At this time, the side surface that constitutes the merging/branching portions 111A and 112A is inclined inward from the upper surface toward the bottom surface.

Further, an offset amount between the line segment and the contour is about 0.1 mm to 0.2 mm as an example. Since a contact surface of the elastomer of the diaphragm member of the valve can be enlarged by the offset, it is possible to further stably seal the valve. Further, the volume of the branching portion can be finely adjusted by the offset. For example, even when the plurality of merging/branching portions have a common valve size, branching portions each having a different volume can be obtained by changing the offset amount. Further, the offset amount may be such that the distance in at least one side among the three sides is different from the distance in another side. When this configuration is adopted, liquid contact areas of the valves can be different from each other, and it is possible to improve an internal pressure resistance of a valve having a small liquid contact area.

The offset may not be present, and the merging/branching portions 111A and 112A may be formed of a recess surrounded by a contour that matches a line segment connecting together apex positions of an equilateral triangle in a plan view (lamination direction view).

The connection portion 113A connects together the merging/branching portions 111A and 112A via apex positions in the merging/branching portions 111A and 112A. The connection portion 113A can employ, as an example, a groove having a straight line shape (connection portions 113D and 113E), a groove having an arc shape, a groove having a straight line shape combined with an arc shape (connection portions 113A to 113C), and the like.

The area and depth (that is, volume) of the merging/branching portions 111A and 112A and the connection portion 113A are set in accordance with the volume of a solution to be quantified in the quantification part GA.

Specifically, in the first flow path 110 of the present embodiment, as an example, the area and depth (that is, volume) of the pair of merging/branching portions 111A, 112A to 111E, 112E in the quantification parts GA to GE are the same, and by adjusting the volumes of the connection portions 113A to 113E, the volumes of the quantification parts GA to GE are adjusted.

For example, as described later, with respect to the quantification part GA in which the amount of solution to be quantified is the highest, the connection portion 113A is formed of a groove that is deeper than that of the merging/branching portions 111A and 112A. On the other hand, with respect to the quantification parts GB to GE, the merging/branching portions 111B, 112B to 111E, 112E and the connection portions 113B to 113E are formed to have the same depth.

The valves V1, V2 are arranged at apex positions at which the connection portion 113A is not arranged (non-arrangement) in the merging/branching portion 111A. The merging/branching portion 111A is connected to the introduction path 51 via the valve V1 and can be connected to or shielded from the introduction path 51 in accordance with the opening and closing of the valve V1. The introduction path 51 is connected to the quantification part GA via the valve V1 at one end and is connected to a reservoir 55 at another end.

An injection hole 53 is provided on the opposite side of the end part to which the introduction path 51 is connected in the reservoir 55. The injection hole 53 is formed to penetrate through the second substrate 9 in the thickness direction. As shown in FIG. 1, the third substrate 8 has an air hole 54 at a position facing the injection hole 53. The air hole 54 is formed to penetrate through the third substrate 8 in the thickness direction. A first solution that is introduced to the first flow path 110 is injected to the reservoir 55 via the air hole 54 and the injection hole 53. The reservoir 55 can store (hold) the injected first solution. Examples of the first solution to be injected and stored in the reservoir 55 include a solution that contains a sample such as a specimen.

The valves V3 and V4 are arranged at apex positions at which the connection portion 113A is not arranged (non-arrangement) in the merging/branching portion 112A. As shown in FIG. 6, the merging/branching portion 112A is connected to the quantification part GB via the valve V4 and can be connected to or shielded from the quantification part GB in accordance with the opening and closing of the valve V4.

Similarly, the quantification part GB is connected to the quantification part GC via the valve V7 and can be connected to or shielded from the quantification part GC in accordance with the opening and closing of the valve V7. The quantification part GC is connected to the quantification part GD via the valve V10 and can be connected to or shielded from the quantification part GD in accordance with the opening and closing of the valve V10. The quantification part GD is connected to the quantification part GE via the valve V13 and can be connected to or shielded from the quantification part GE in accordance with the opening and closing of the valve V13. The quantification part GE is connected to the discharge path 52 via the valve V16 and can be connected to or shielded from the discharge path 52 in accordance with the opening and closing of the valve V16.

The discharge path 52 is connected to the quantification part GE via the valve V16 at one end and is connected to the waste liquid tank 7 at another end.

The first flow path 110 can communicate with the air hole 54, the injection hole 53, the reservoir 55, the waste liquid tank 7, and the air hole 35, by opening the valves V1, V4, V7, V10, V13, and V16 in a state where the valves V2, V3, V5, V6, V8, V9, V11, V12, V14, and V15 are closed. In the first flow path 110, the quantification parts GA to GE are partitioned by closing the valves V1 to V16.

Figure 7:
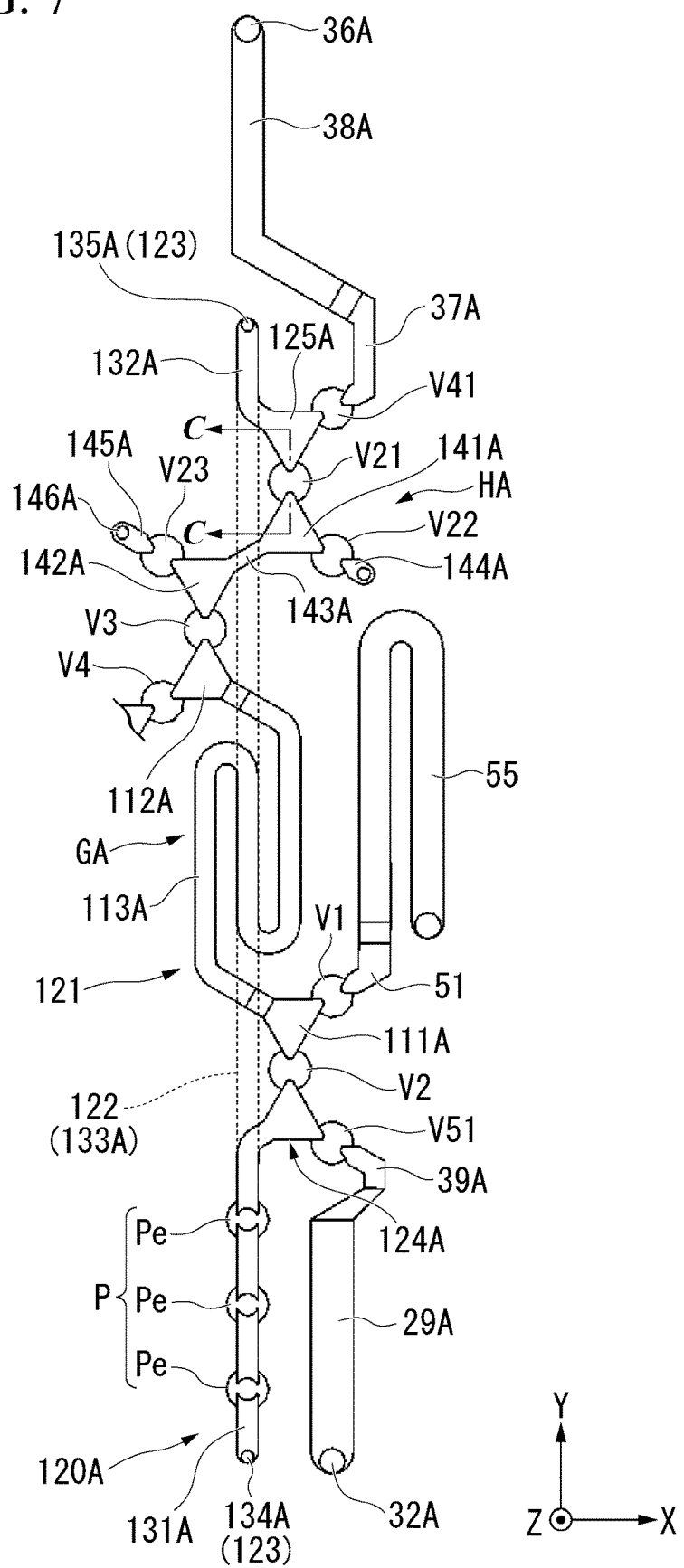
FIG. 7 is a partially enlarged plan view of a second flow path 120A according to the embodiment.

FIG. 7 is a partially enlarged plan view of a second flow path 120A according to the embodiment.

The second flow path 120A is a circulation flow path formed in an annular shape (loop shape) along a plane substantially parallel to a YZ plane. The second flow path 120A includes: a first part 121 that is provided on the upper surface 9b of the second substrate 9 and that is formed of a groove part along a substantially Y direction by being covered by the first substrate 6; a second part 122 that is provided on the lower surface 9a of the second substrate 9 and that is formed of a groove part along the Y direction by being covered by the third substrate 8 as shown in FIG. 3; and a third part 123 that penetrates through the second substrate 9 in the thickness direction and that connects together the first part 121 and the second part 122 at positions at each of both end sides in the Y direction. The third part 123 may penetrate through the second substrate 9 substantially perpendicularly to, for example, a joint surface between the first substrate 6 and the second substrate 9 and a joint surface between the second substrate 9 and the third substrate 8.

The first part 121 has merging/branching portions 124A and 125A, upper surface flow paths 131A and 132A, a quantification part HA, and a quantification part GA. That is, the quantification part GA is provided as a shared part shared by the first flow path 110 and the second flow path 120A. Further, the second flow path 120A includes the first part 121 (that is, the merging/branching portions 124A and 125A, the upper surface flow paths 131A and 132A, the quantification part HA) that excludes the quantification part GA, the second part 122, and the third part 123 as a non-shared part that is not shared with the first flow path 110.

Figure 8:
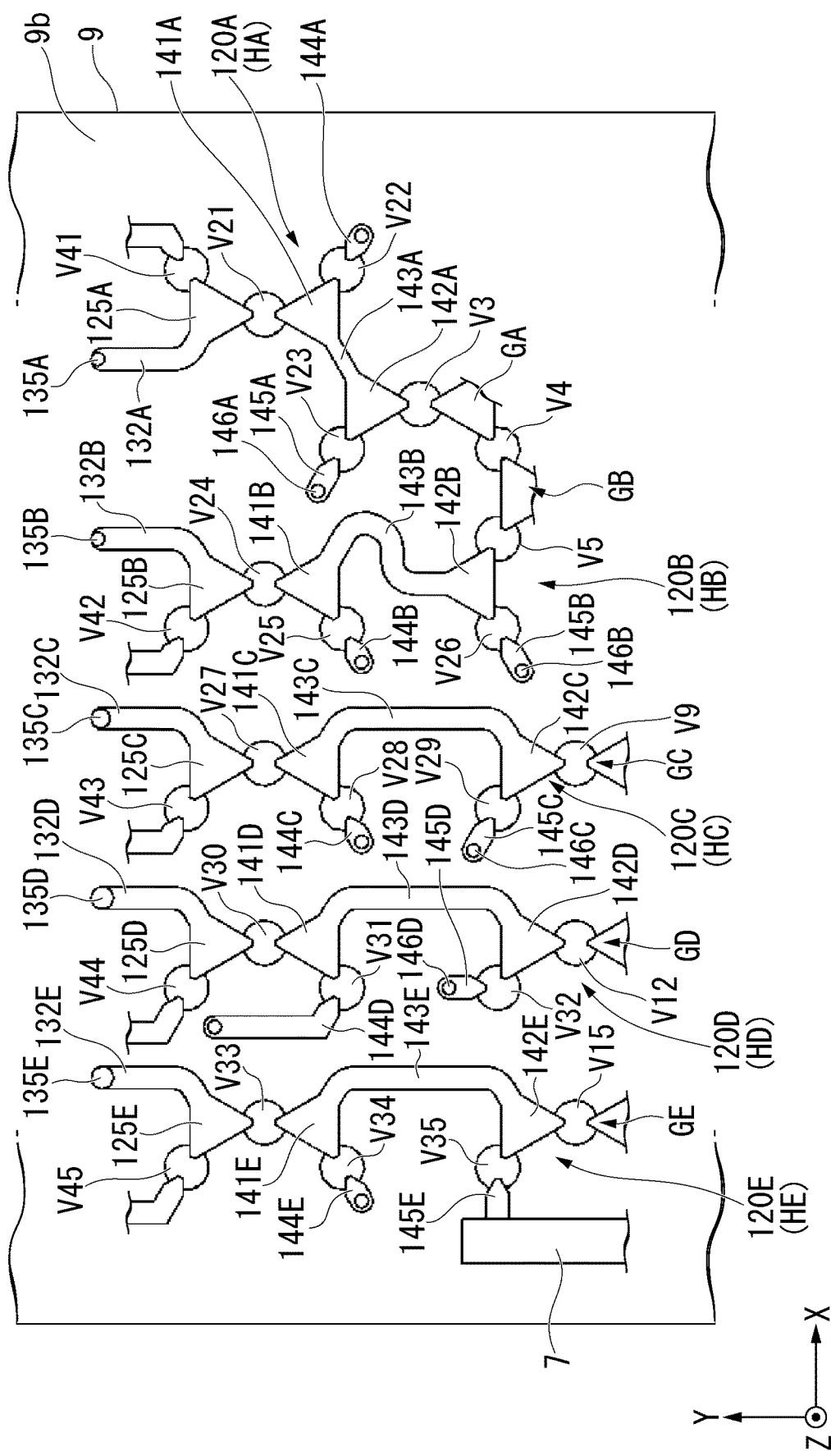
FIG. 8 is a partially enlarged plan view of the vicinity of quantification parts HA to HE in second flow paths 120A to 120E according to the embodiment.

The quantification part HA is one of regions that adjust the volume of the second solution mixed with the first solution in the second flow path 120A. FIG. 8 is a partially enlarged plan view of the vicinity of the quantification parts HA to HE in second flow paths 120A to 120E.

As shown in FIG. 8, the quantification parts HA to HE are provided in the second flow paths 120A to 120E, respectively. Since the quantification parts HA to HE have similar components, the quantification part HA is described below as a representative (with respect to components in the quantification parts HB to HE that correspond to the quantification part HA, a last symbol A of a reference sign is indicated as B to E).

The quantification part HA includes a pair of merging/branching portions 141A and 142A and a connection portion 143A. The merging/branching portions 141A and 142A have a configuration similar to the merging/branching portions 111A and 112A. The connection portion 143A connects together the merging/branching portions 141A and 142A via apex positions in the merging/branching portions 141A and 142A. The connection portion 143A can employ, as an example, a groove having a straight line shape (connection portions 143D and 143E), a groove having an arc shape, a groove having a straight line shape combined with an arc shape (connection portions 143A to 143C), and the like.

The area and depth (that is, volume) of the merging/branching portions 141A and 142A and the connection portion 143A are set in accordance with the volume of a solution to be quantified in the quantification part HA.

Specifically, in the second flow path 120A of the present embodiment, as an example, the area and depth (that is, volume) of the pair of merging/branching portions 141A, 142A to 141E, 142E in the quantification parts HA to HE are the same, and by adjusting the volumes of the connection portions 143A to 143E, it is possible to adjust the volumes of the quantification parts HA to HE.

The valves V21 and V22 are arranged at apex positions at which the connection portion 143A is not arranged (non-arrangement) in the merging/branching portion 141A. The merging/branching portion 141A is connected to the merging/branching portion 125A via the valve V21 and can be connected to or shielded from the merging/branching portion 125A in accordance with the opening and closing of the valve V21. The merging/branching portion 141A is connected to an air introduction path 144A via the valve V22 and can be connected to or shielded from the air introduction path 144A that is open to the atmosphere in accordance with the opening and closing of the valve V22.

Valves V3 and V23 are arranged at apex positions at which the connection portion 143A is not arranged (non-arrangement) in the merging/branching portion 142A. The merging/branching portion 142A is connected to the quantification part GA via the valve V3 and can be connected to or shielded from the quantification part GA in accordance with the opening and closing of the valve V3.

The merging/branching portion 142A is connected to a discharge path (diluting solution discharge port) 145A via the valve V23 and can be connected to or shielded from the discharge path 145A in accordance with the opening and closing of the valve V23. The discharge path 145A is connected to the quantification part HA which is a non-shared part in the vicinity of the valve V3 provided on an end part at the +Y side of the quantification part GA which is a shared part. As shown in FIG. 5, a discharge hole 146A that penetrates through the second substrate 9 is connected to the discharge path 145A. As shown in FIG. 3, the discharge hole 146A is connected to a drain path 140 formed on the lower surface 9a of the second substrate 9. The drain path 140 is connected to the waste liquid tank 7.

Although discharge paths 145A to 145D of the quantification part HA to HD are connected to the waste liquid tank 7 through discharge holes 146A to 146D and the drain path 140, as shown in FIG. 8, a discharge path 145E of the quantification part HE is directly connected to the waste liquid tank 7.

With reference back to FIG. 7, the merging/branching portion 124A is formed of a recess that is surrounded by a contour which is parallel to line segments connecting together apex positions of an equilateral triangle in a plan view and which is offset from the line segments by a predetermined distance to an inward of the equilateral triangle similarly to the merging/branching portions 111A and 112A. One of apex positions in the merging/branching portion 124A and one of apex positions in the merging/ branching portion 111A are arranged at the same position. The merging/branching portion 111A and the merging/branching portion 124A can be connected to or shielded from each other in accordance with the opening and closing of the valve V2 arranged at the apex positions at the same position.

The upper surface flow path 131A is connected to one of the apex positions that is different from the apex position at which the valve V2 is arranged in the merging/branching portion 124A, and the valve V51 is arranged at another apex position.

The upper surface flow path 131A extends along the Y direction. The upper surface flow path 131A is connected to the merging/branching portion 124A at the +Y side, and a pump P is provided in the middle thereof. The pump P is constituted of three element pumps (drive valves) Pe which are arranged side by side in the flow path. The element pump Pe is a so-called valve pump. The pump P can adjust and transport the flow of the solution in the circulation flow path (second flow path 120A) by sequentially opening and closing the three element pumps Pe in cooperation with each other. The number of element pumps Pe that constitute the pump P may be three or more and may be, for example, 4, 5, 6, 7, 8, 9, or 10.

As shown in FIG. 2, the element pumps Pe are arranged on straight lines L1 to L3 having the same position in the Y direction and extending in the X direction over the second flow paths 120A to 120E, respectively. Accordingly, by supplying a force for driving the element pump Pe along the straight lines L1 to L3, it is possible to collectively drive respective element pumps Pe of the second flow paths 120A to 120E. Therefore, it is possible to synchronize the flows of solutions in the second flow paths 120A to 120E.

Similarly to the merging/branching portion 124A, the merging/branching portion 125A is formed of a recess that is surrounded by a contour which matches line segments connecting together apex positions of an equilateral triangle in a plan view or a contour which is parallel to the line segments and which is offset by a predetermined distance from the line segments to an inward of the equilateral triangle. One of apex positions in the merging/branching portion 125A and one of apex positions in the merging/branching portion GB12 are arranged at the same position. The merging/branching portion 125A and the merging/branching portion GB12 can be connected to or shielded from each other in accordance with the opening and closing of the valve V3 arranged at the apex positions at the same position.

The upper surface flow path 132A is connected to one of the apex positions that is different from the apex position at which the valve V21 is arranged in the merging/branching portion 125A, and the valve V41 is arranged at another apex position.

The upper surface flow path 132A extends along the Y direction. The upper surface flow path 132A is connected to the merging/branching portion 125A at the −Y side.

As shown in FIG. 3, the second part 122 has a lower surface flow path 133A. The lower surface flow path 133A extends along the Y direction. Part of the lower surface flow path 133A overlaps the upper surface flow paths 131A and 132A and the quantification parts GA, HA in the lamination direction view. That is, the first part 121 and the second part 122 partially overlap each other in the thickness direction of the second substrate 9.

The third part 123 has connection holes 134A and 135A. As shown in FIG. 4, the connection hole 134A penetrates through the second substrate 9. The connection hole 134A connects together a −Y side end part of the upper surface flow path 131A and a −Y side end part of the lower surface flow path 133A. The connection hole 135A penetrates through the second substrate 9. The connection hole 135A connects together a +Y side end part of the upper surface flow path 132A and a +Y side end part of the lower surface flow path 133A.

As shown in FIG. 7, the reservoir 29 is connected to the second flow path 120A via the supply path 39A, and a recovery path 38A is connected to the second flow path 120A via a recovery port 37A. The supply path 39A is connected to the merging/branching portions 124A which is a non-shared part in the vicinity of the valve V2 provided on an end part at the −Y side of the quantification part GA which is a shared part. The reservoir 29A is provided substantially parallel to the upper surface flow path 131. As shown in FIG. 5, the reservoir 29A is formed of a groove part that opens to the upper surface 9b of the second substrate 9. The injection hole 32A that penetrates through the second substrate 9 and the third substrate 8 in the Z direction and that opens to the lower surface 8a of the third substrate 8 is formed on a −Y side end part of the reservoir 29A. A solution is injected to the reservoir 29A from the lower surface 8a side via the injection hole 32A and is stored.

As shown in FIG. 2, the second flow paths 120A to 120E includes separate and independent reservoirs 29A to 29E, respectively. Examples of the second solution filled in the reservoirs 29A to 29E include a solution containing a reagent to be mixed with a sample contained in the first solution stored in reservoir 55 or a diluting solution that dilutes an undiluted solution containing the sample. The reagents filled in the reservoirs 29A to 29E may be reagents of the same type or may be reagents of different types. Further, when the second solution is a diluting solution, diluting solutions of the same concentration may be filled to the reservoirs 29A to 29E, or diluting solutions of different concentrations may be filled to the reservoirs 29A to 29E.

The supply path 39A can be connected to or shielded from the merging/branching portion 124A in accordance with the opening and closing of the valve V51. The reservoir 29A in the second flow path 120A is partitioned with respect to the second flow path 120A by closing the valve V51.

The recovery port 37A and the recovery path 38A can be connected to or shielded from the merging/branching portion 125A in accordance with the opening and closing of the valve V41. The recovery path 38A extends toward the +Y side, and a recovery hole 36A is formed at an end. The recovery hole 36A penetrates through the second substrate 9 and the third substrate 8 in the Z direction and opens to the lower surface 8a of the third substrate 8.

Figure 9:
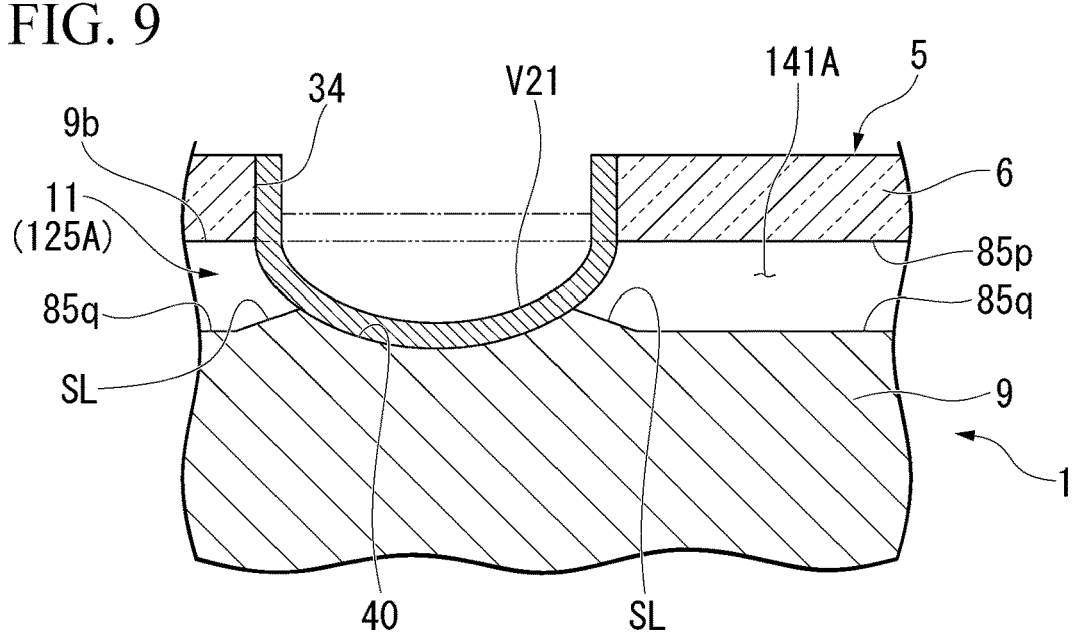
Figure 10:
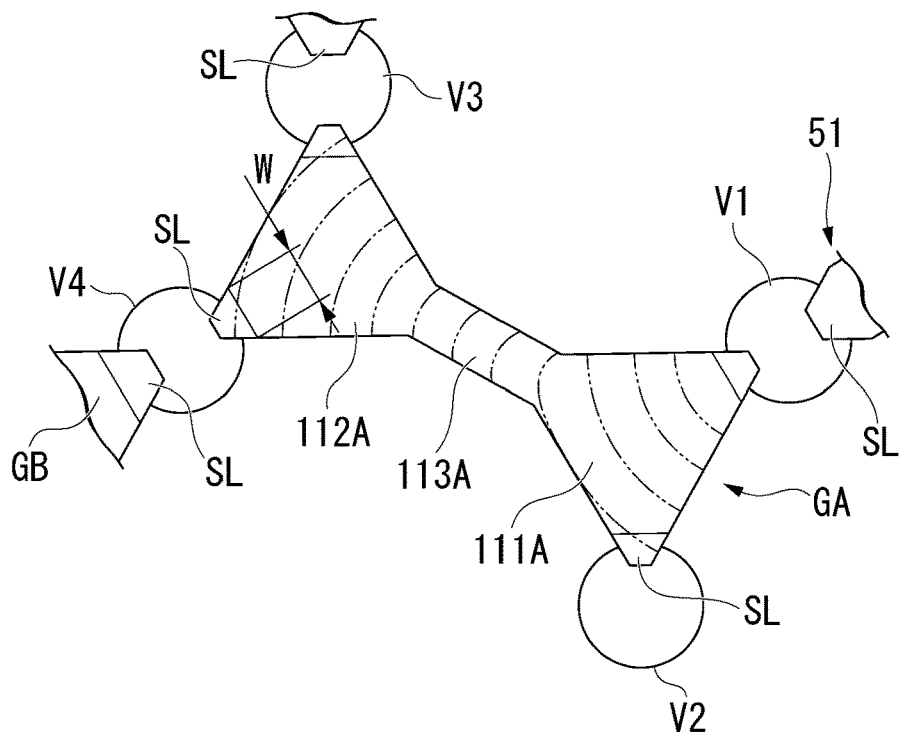
FIG. 10 is a partial plan view schematically showing the fluidic device according to the embodiment.

FIG. 9 is a cross-sectional view of the base material 5 taken along a line C-C in FIG. 7. Although the structures of the merging/branching portions 125A and 141A and the valve V21 will be described here as representatives, other merging/branching portions and the valves V1 to V16, V22 to V35, V41 to V45, and V51 to V55 also have a similar configuration.

Each of the center positions of the merging/branching portions 111A to 111E, 112A to 112E, 124A to 124E, 125A to 125E, 141A to 141E, and 142A to 142E and the valves V1 to V16, V21 to V35, V41 to V45, and V51 to V55 described above is arranged at a position selected from a predetermined number of index points arranged in a two-dimensional hexagonal lattice pattern.

First, a structure of the valve V21 is described.

As shown in FIG. 9, a valve holding hole 34 that holds the valve V21 is provided in the first base material 6. The valve V21 is held by the first substrate 6 in the valve holding hole 34. The valve V21 is constituted of an elastic material. Examples of the elastic material that can be employed for the valve V21 include rubber, an elastomer resin, and the like. A recess 40 having a hemispherical shape is provided in the flow path 11 directly below the valve V21. The recess 40 has a circular shape in a plan view at the upper surface 9b of the second material 9. The diameter of the recess 40 at the upper surface 9b is preferably, for example, 1.0 to 3.0 mm.

The valve V21 elastically deforms downward, changes the cross-sectional area of the flow path, and thereby adjusts the flow of the solution in the flow path 11. The valve V21 elastically deforms downward, comes into contact with the recess 40, and thereby closes the flow path 11. Further, the valve V21 opens the flow path 11 by separating from the recess 40 (a virtual line (two-dot chain line) of FIG. 9).

An inclined portion SL that is located at a boundary between the valve V21 (recess 40) and the merging/branching portions 125A and 141A and that reduces the distance from a top surface 85p toward the valve V21 is provided on a bottom surface 85q of the merging/branching portions 125A and 141A. By providing the inclined portion SL, for example, as compared with a case where the inclined portion SL is not provided and there is a step (corner part) at the boundary between a bottom part of the recess 40 and the bottom surface 85q of the merging/branching portions 125A and 141A, it is possible to smoothly introduce a solution to the valve V21, and it is possible to effectively prevent residual air bubbles at the step (corner part).

Further, the inclined portion SL described above is also provided at a boundary between the recess 40 and each of the recovery port 37A, the supply path 39A, and the introduction path 51A. The inclined portion SL is particularly effective when the flow path 11 is flat and has a lyophilic property with respect to the solution. The flatness of the flow path 11 means that the depth of the flow path 11 is smaller than the width of the flow path 11.

Each inclined portion SL has a taper shape that reduces the diameter at an angle of 60° toward the center of the valve. A maximum width W (refer to FIG. 10) of the inclined portion SL described above in the taper shape is preferably about 0.5 to 1.5 mm.

When the lowest position of the recess 40 is at a position that is higher than the bottom surface 85q of the merging/branching portions 125A and 141A, the configuration that includes the inclined portion SL described above works effectively. However, when the lowest position of the recess 40 is at a position that is lower than the bottom surface 85q of the merging/branching portions 125A and 141A, a configuration may be employed in which the bottom surface 85q and the recess 40 intersect each other without providing the inclined portion SL.

Next, a method of mixing the first solution and the second solution using the above-described fluidic device 1 is described. In the present embodiment, an undiluted solution containing a sample is used as a first solution, and a diluting solution that dilutes the first solution (undiluted solution) is used as a second solution. When the undiluted solution and the diluting solution are mixed, the fluidic device 1 described above is prepared in advance.

In the present embodiment, the undiluted solution is diluted at a dilution ratio of 1/2 to 1/32 regarding the second flow paths 120A to 120E as shown in [Table 1]. In the fluidic device 1, the volume of each of the quantification parts GA to GE which are shared parts is set in accordance with an undiluted solution amount shown in [Table 1]. Further, in the fluidic device 1, the volume of the non-shared part excluding the quantification parts GA to GE in each of the second flow paths 120A to 120E is set in accordance with a diluting solution amount shown in [Table 1]. The volume of the shared part and the volume of the non-shared part described above are set in accordance with a volume ratio that corresponds to the dilution ratio described above.

TABLE 1

| | Dilution ratio | Amount of undiluted solution (first solution) | Amount of diluting solution (second solution) |
|---|---|---|---|
| Second flow path 120A | 1/2 | 24 μl | 24 μl |
| Second flow path 120B | 1/4 | 12 μl | 36 μl |
| Second flow path 120C | 1/8 | 6 μl | 42 μl |
| Second flow path 120D | 1/16 | 3 μl | 45 μl |
| Second flow path 120E | 1/32 | 3 μl | 93 μl |

(Procedure in which First Solution is Supplied from Reservoir 55 to First Flow Path 110 and is Quantified)

Next, in the fluidic device 1, a procedure in which a first solution (undiluted solution) is supplied to the first flow path 110 from the reservoir 55 and is quantified, and a procedure in which a second solution (diluting solution) is supplied to the second flow path 120A from the reservoirs 29A to 29E and is quantified are described. It does not matter which of the quantification of the first solution in the first flow path 110 and the quantification of the second solution in the second flow path 120A comes first. Further, it is assumed that a solution of an amount equal to or more than the amount shown in [Table 1] is filled in advance in the reservoir 55 and the reservoir 29A.

When a solution is supplied to the first flow path 110 and quantified, first, the valves V2, V3, V5, V6, V8, V9, V11, V12, V14, and V15 are closed, and the valves V1, V4, V7, V10, V13, and V16 are opened. Thereby, the quantification parts GA to GE, the introduction path 51, and the discharge path 52 that constitute the first flow path 110 communicate with the injection hole 53, the air hole 54, the reservoir 55, the waste liquid tank 7, and the air hole 35.

Next, a negative pressure suction is performed in the waste liquid tank 7 from the air hole 35 shown in FIG. 5 using a suction device (not shown). Thereby, the solution in the injection hole 53 moves to the flow path 11 side via the introduction path 51. Further, air that passes through the air hole 54 is introduced to the rear of the solution of the introduction path 51. Thereby, the first solution accommodated in the reservoir 55 is sequentially introduced to the quantification parts GA to GE and the discharge path 52 via the introduction path 51.

For example, when a solution is introduced to the quantification part GA, the solution introduced from the introduction path 51 to the merging/branching portion 111A via the valve V1 is introduced to the merging/branching portion 112A via the connection portion 113A.

Here, since the inclined portion SL described above is provided at the boundary between the introduction path 51 and the valve V1, the first solution can be smoothly introduced to and filled in the valve V1 in a state where residual air bubbles are prevented at the boundary between the introduction path 51 and the valve V1 (recess 40). Further, the merging/branching portion 111A is formed in an equilateral triangle shape in a plan view, and the distances from the valve V1 (recess 40) as a base point to the valve V2 and the connection portion 113A that are arranged at other apex positions are the same. Therefore, the first solution introduced from the valve V1 to the merging/branching portion 111A arrives at the valve V2 and the connection portion 113A almost at the same time as shown by a two-dot chain line in FIG. 10.

As a result, for example, it is possible to prevent a situation in which the solution that has first arrived at the connection portion 113A flows to the connection portion 113A, and air bubbles remain in the vicinity of the valve V2.

Further, with respect to the merging/branching portion 112A to which a solution is introduced via the connection portion 113A, the merging/branching portion 112A is formed in an equilateral triangle shape in a plan view, and the distances from the connection portion 113A as a base point to the valves V3 and V4 that are at other apex positions are the same. Therefore, the first solution introduced from the connection portion 113A to the merging/branching portion 112A arrives at the valves V3 and V4 almost at the same time as shown by a two-dot chain line in FIG. 10.

As a result, for example, it is possible to prevent a situation in which the first solution that has first arrived at the valve V4 flows to the quantification part GB, and air bubbles remain in the vicinity of the valve V3.

Then, by closing the valves V1, V4, V7, V10, V13, and V16 (that is, the valves V1 to V16 are closed), each of the quantification parts GA to GE is partitioned. As a result, as shown in FIG. 1, a first solution SA is quantified at an amount shown in [Table 1] in each of the quantification parts GA to GE in a state where residual air bubbles are prevented (in FIG. 1, the first solution SA is displayed only in the quantification part GA).

In other words, the quantification part GA is separated from the first flow path 110 in a state where the first solution SA is quantified by closing the valves V1 and V4.

Next, when a solution is supplied from the reservoir 29A to the second flow path 120A and is quantified, first, the valves V1 to V4, V22, and V41 are closed, and the valves V21, V23, and V51 are opened. Thereby, the reservoir 29A communicates with the waste liquid tank 7 via the supply path 39A, the merging/branching portion 124A and the upper surface flow path 131A that constitute the first part 121, the connection hole 134A that constitutes the third part 123, the lower surface flow path 133A that constitutes the second part 122, the connection hole 135A that constitutes the third part 123, the upper surface flow path 132A and the quantification part HA that constitute the first part 121, the discharge path 145A, the discharge hole 146A, and the drain path 140.

Next, a negative pressure suction is performed in the waste liquid tank 7 via the air hole 35 using the suction device described above. Thereby, the second solution in the reservoir 29A is sequentially introduced via the supply path 39A to the merging/branching portion 124A, the upper surface flow path 131A, the connection hole 134A, the lower surface flow path 133A, the connection hole 135A, the upper surface flow path 132A, the merging/branching portion 125A, the quantification part HA, the discharge path 145A, the discharge hole 146A, and the drain path 140.

Even when the second solution is introduced via the supply path 39A to the second flow path 120A excluding the quantification part GA, the merging/branching portions 124A, 125A, 141A, and 142A are formed in an equilateral triangle shape in a plan view, and the distances to other apex positions from the valve V51, the upper surface flow path 132A, the valve V21, and the connection portion 143A, respectively, as a base point are the same. Therefore, the second solution introduced from the supply path 39 to the second flow path 120A excluding the quantification part GA is introduced in a state of preventing a situation in which air bubbles remain.

Then, by closing the valves V23 and V51, a region excluding the quantification part GA of the second flow path 120A is partitioned. As a result, as shown in FIG. 1, in the second flow path 120A, a second solution SB is quantified at an amount ($24p1$) shown in [Table 1] in a state where residual air bubbles are prevented in the merging/branching portion 124A, the upper surface flow path 131A, the connection hole 134A, the lower surface flow path 133A, the connection hole 135A, the upper surface flow path 132A, the merging/branching portion 125A, the quantification part HA that exclude the quantification part GA.

When quantifying the second solution in other second flow paths 120B to 120E, the procedure of quantifying the second solution SB in the second flow path 120A that excludes the quantification part GA may be similarly performed. Further, when quantifying the second solution SB in the second flow path 120A, a procedure of quantifying the second solution also in one or more of the second flow paths 120B to 120E at the same time may be performed. When quantifying the second solution with respect to two or more of the second flow paths 120A to 120E at the same time, although the negative pressure suction force of the suction device increases, it is possible to shorten the time required for quantifying the second solution.

(Procedure of Mixing Solutions SA and SB in Flow Path 11)

Next, a procedure of mixing the solutions SA and SB supplied to the flow path of the fluidic device 1 is described. First, as described above, the valves V2, V3 are opened in a state where the first solution SA is quantified in the quantification part GA, and the second solution SB is quantified in the second flow path 120A that excludes the quantification part GA. Thereby, the second flow path 120A having an annular shape, including the quantification parts GA and HA, and directed along a plane substantially parallel to the YZ plane.

That is, the quantification part GA is switched such that by opening the valves V1 and V4 and closing the valves V2 and V3 among the valves V1 to V4, the quantification part GA becomes part of the first flow path 110 and such that by opening the valves V2 and V3 and closing the valves V1 and V4, the quantification part GA becomes part of the second flow path 120A.

Then, the first solution SA and the second solution SB in the second flow path 120A are sent and circulated using the pump P. With respect to the first solution SA and the second solution SB that circulate in the second flow path 120A, the flow rate in the vicinity of the wall surface is low, and the flow rate at the center of the flow path is high due to an interaction (friction) between the solution and the flow path wall surface in the flow path. As a result, since the flow rate of the solution can be distributed, the mixing and reaction of the first solution SA and the second solution SB that are quantified are promoted.

In the second flow paths 120A to 120E, the first solution SA and the second solution SB are circulated and mixed, and thereby, solutions in which undiluted solutions are diluted at dilution ratios of 1/2 to 1/32 (solutions in which the concentrations of the undiluted solutions are 50 volume %, 25 volume %, 12.5 volume %, 6.25 volume %, and 3.125 volume %) are obtained, respectively.

Subsequently, by closing the valve V21 and opening the valves V22 and V41, a second flow path 200A communicates with the recovery hole 36A via the recovery port 37A and the recovery path 38A on one of sides that interpose the valve V21. Further, the second flow path 200A communicates with the air introduction path 144A on another of the sides that interpose the valve V21.

Then, a negative pressure suction of the recovery hole 36A is performed using a suction device. Thereby, the undiluted solution having a dilution ratio of 1/2 in the second flow path 120A is removed and recovered via the recovery port 37A, the recovery path 38A, and the recovery hole 36A. Similarly, in the second flow paths 200B to 200E, by closing the valves V24, V27, V30, and V33, opening the valves V25, V28, V31, V34, and V42 to V45, and performing a negatively pressure suction of recovery holes 36B to 36E, undiluted solutions having dilution ratios of 1/4, 1/8, 1/16, and 1/32 in second flow paths 200B to 200E are individually recovered, respectively.

As described above, in the fluidic device 1 of the present embodiment, since the quantification parts GA to GE as a shared part in which the first solution is quantitated in the first flow path 110 is shared by the second flow paths 120A to 120E, and the volume ratio of the volume of a non-shared part that is not shared with the first flow path 110 in which the second solution is quantitated in the second flow path 120A to the volume of the shared part described above is set based on the dilution ratio (mixing ratio) of the first solution and the second solution, it is possible to easily obtain the first solutions diluted at a plurality of ratios that are different from each other.

Further, in the fluidic device 1 of the present embodiment, since the annular second flow paths 120A to 120E along a plane substantially parallel to the YZ plane are provided independently of each other along the X direction with respect to the first flow path 110 arranged along the X direction, it is possible to realize miniaturization as compared to a case in which a plurality of annular flow paths are provided independently, for example, in the XY plane.

In particular, in the fluidic device 1 of the present embodiment, since at least part of the first part 121 and the second part 122 overlap in the lamination direction view, it is possible to further miniaturize the fluidic device 1. Therefore, in the fluidic device 1 of the present embodiment, for example, even when one type of sample is tested by a plurality of types of reagents, it is possible to perform the test using a small facility.

Further, in the fluidic device 1 of the present embodiment, since the quantification part GA is switched to part of the first flow path 110 or part of the second flow path 120A by the opening and closing of the valves V1 to V4, it is possible to easily and quickly perform the switching of the shared part. That is, it is possible to easily switch between an operation in which a liquid is introduced to the quantification parts GB1 to GB5 in the first flow path 110 and an operation in which a liquid in the quantification parts GB1 to GB5 is circulated in the second flow paths 120A to 120E. Further, the liquid introduced in the first flow path 110 can be introduced to the second flow paths 120A to 120E without waste.

Further, in the fluidic device 1 of the present embodiment, since the first flow path 110 and the second flow paths 120A to 120E have the merging/branching portions 111A, 112A, 124A, 125A, 141A, and 142A each of which is surrounded by a contour parallel to each line segment connecting together the apex positions of the equilateral triangle and in which merging or branching of the solution is performed, it is possible to quantify the solutions SA and SB with high accuracy while preventing air bubbles from being generated.

Therefore, in the fluidic device 1 of the present embodiment, it is possible to perform a measurement with high accuracy using the solutions SA and SB that are quantified with high accuracy without being affected by air bubbles.

Further, in the fluidic device 1 of the present embodiment, in the first flow path 110, the quantification parts GA to GE which correspond to the shared parts with the second flow paths 120A to 120E are continuous through the valve, and thereby, the sample can be transferred to the second flow paths without waste as compared to a case in which the sample is transferred to the second flow paths 120A to 120E through a sample introduction flow path that branches from the first flow path 110. This is particularly effective when the sample amount is very small.

Further, in the fluidic device 1 of the present embodiment, since the element pumps Pe are arranged on the straight lines L1 to L3 having the same position in the Y direction and extending in the X direction over the second flow paths 120A to 120E, respectively, it is possible to collectively drive respective element pumps Pe of the second flow paths 120A to 120E. Therefore, in the fluidic device 1 of the present embodiment, it is possible to easily synchronize the flow of the solution in the second flow paths 120A to 120E.

Further, in the fluidic device 1 of the present embodiment, since the valves V1 to V16, V21 to V35, V41 to V45, and V51 to V55 and the element pumps Pe described above are arranged on the first part 121 formed on the upper surface 9b, the force for diving the valves may be supplied from one side (+Z side) of the base material 5 in the lamination direction, and it is possible to contribute to miniaturization and cost reduction of the device as compared with a case in which the force is supplied from both sides in the lamination direction.

When a detection part is provided in the second flow paths 120A to 120E that constitute the circulation flow path, it is possible to detect a sample substance contained in the first solution. When detecting the sample substance, it is possible to directly or indirectly detect the sample substance. As an example of indirectly detecting the sample substance, the sample substance may be combined with a detection auxiliary substance that assists the detection of the sample substance. When a labeling substance (detection auxiliary substance) is used, a solution containing the sample substance mixed with the labeling substance and bound to the detection auxiliary substance may be used as a first solution. The detection part may be one that optically detects the sample substance and may include an objective lens and an imaging unit as an example. The imaging unit may include, for example, an EMCCD (Electron Multiplying Charge Coupled Device) camera. Further, the detection unit may be one that electrochemically detects the sample substance and may include an electrode as an example.

Examples of the labeling substance (detection auxiliary substance) include fluorescent dyes, fluorescent beads, fluorescent proteins, quantum dots, gold nanoparticles, biotin, antibodies, antigens, energy-absorbing substances, radioisotopes, chemical illuminants, enzymes, and the like.

Examples of the fluorescent dyes include FAM (carboxyfluorescein), JOE (6-carboxy-4',5'-dichloro2',7'-dimethoxyfluorescein), FITC (fluorescein isothiocyanate), TET (tetrachlorofluorescein), HEX (5'-hexachloro-fluorescein-CE phosphoromidite), Cy3, Cy5, Alexa568, Alexa647, and the like.

Examples of the enzymes include alkaline phosphatase, peroxidase, and the like.

Further, when a capture part capable of capturing the sample substance is provided in the second flow paths 120A to 120E that constitute the circulation flow path, the sample substance can be efficiently detected by the detection part. The sample substance can be concentrated by discharging the solution from the second flow paths 120A to 120E while continuing the capture of the sample substance. Further, the sample substance captured by the capture part can be washed by introducing the cleaning liquid to the second flow paths 120A to 120E and circulating the cleaning liquid while continuing the capture of the sample substance.

By capturing the sample substance itself or carrier particles bound to the sample substance, the capture part can collect the sample substance from the solution that circulates in the second flow paths 120A to 120E. The capture part is, for example, a magnetic force generating source such as a magnet. The carrier particles are, for example, magnetic beads or magnetic particles.

Further, by providing a circulation flow path different from the second flow paths 120A to 120E as a reaction part in the fluidic device 1 and providing the detection part, the capture part, and the like described above in the reaction part, for example, it is possible to perform a desired reaction such as detection, capture, wash, and dilution.

[Second Embodiment of Fluidic Device 1]

Next, a second embodiment of the fluidic device 1 is described with reference to FIG. 11 to FIG. 16.

In these drawings, the same elements as the constituent elements of the first embodiment shown in FIG. 1 to FIG. 10 are denoted by the same reference numerals, and description thereof will be omitted.

Although the first embodiment is described using a configuration in which the undiluted solution (first solution) is mixed (diluted) with the diluting solution (second solution) using the second flow paths 120A to 120E arranged in parallel, the second embodiment is described using a configuration in which a plurality of steps of flow paths that dilute the undiluted solution with the diluting solution are provided in a step manner.

Figure 11:
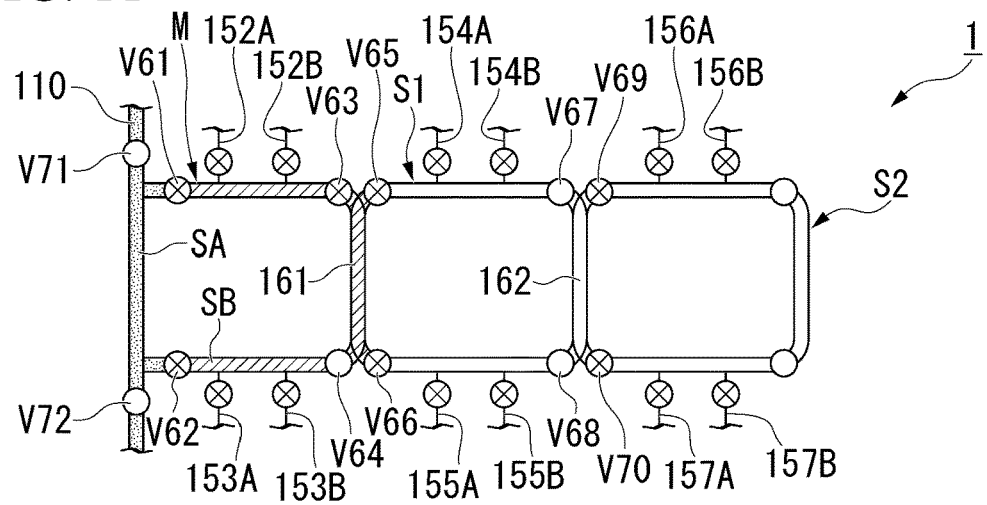
FIG. 11 is a plan view schematically showing the fluidic device according to the embodiment.

FIG. 11 is a plan view schematically showing the fluidic device 1 according to the second embodiment.

As shown in FIG. 11, the fluidic device 1 includes: a first flow path 110 described in the first embodiment as an introduction flow path that introduces an undiluted solution; a circulation flow path (first circulation flow path) M; and a plurality (two in FIG. 11) of circulation flow paths (third circulation flow path) S1 and S2. The circulation flow path M is a main flow path in which a solution that is introduced from the first flow path 110 is mixed with a diluting solution. The solution that is introduced from the first flow path 110 is a mixed solution (hereinafter, referred to as an undiluted solution SA) in which the undiluted solution is mixed with the diluting solution and is diluted to a predetermined ratio.

The circulation flow paths S1 and S2 are auxiliary flow paths that share some flow path with a preceding circulation flow path (the circulation flow path M in the case of the circulation flow path S1, and the circulation flow path S1 in the case of the circulation flow path S2) as a shared flow path and that mix the mixed solution of the undiluted solution and the diluting solution accommodated in the shared flow path with a diluting solution accommodated in a non-shared flow path that is not shared with the preceding circulation flow path. Further, the circulation flow path S1 has a shared flow path that shares part of the non-shared flow path described above with the subsequent circulation flow path S2 as an undiluted solution supply part.

In the second embodiment, the flow path that supplies and discharges the undiluted solution or the diluting solution with respect to the circulation flow path M and the circulation flow paths S1 and S2 and the pump that moves the solution in each circulation flow path or the like are simplified or omitted.

The first flow path 110 is arranged on an extension line of one side of the circulation flow path M having a rectangular shape. Valves V71 and V72 are provided in the first flow path 110 in the vicinity of an intersection with the circulation flow path M.

A valve V61 is provided in the circulation flow path M in the vicinity (at an introduction side of the undiluted solution SA) of the intersection with the first flow path 110. A valve V62 is provided in the circulation flow path M in the vicinity (at a discharge side of the undiluted solution SA) of the intersection with the first flow path 110. The circulation flow path M includes valves V63 and V64 that are provided to interpose a shared flow path (shared part) 161 which is shared with the circulation flow path 51.

Further, an introduction path 152A to which a diluting solution SB is introduced, an introduction path 152B to which air is introduced when the mixed solution is recovered, a discharge path 153A through which the diluting solution SB is discharged when the diluting solution SB is introduced via the introduction path 152A, and a recovery path 153B that recovers the mixed solution of the undiluted solution SA and the diluting solution SB are connected to the circulation flow path M. When the diluting solution SB is introduced to the circulation flow path M, the diluting solution SB is discharged from the discharge path 153A, and when the mixed solution is recovered from the circulation flow path M, air is introduced from the introduction path 152B; however, description thereof is omitted below.

The circulation flow path S1 includes valves V65 and V66 that are provided to interpose the shared flow path 161 and valves V67 and V68 that are provided to interpose a shared flow path (shared part) 162 that is shared with the subsequent circulation flow path S2. An introduction path 154A to which a diluting solution is introduced, an introduction path 154B to which air is introduced when the mixed solution is recovered, a discharge path 155A through which the diluting solution SB is discharged when the diluting solution SB is introduced via the introduction path 154A, and a recovery path 155B that recovers the mixed solution of the undiluted solution and the diluting solution are connected to the circulation flow path S1. When the diluting solution SB is introduced to the circulation flow path S1, the diluting solution SB is discharged from the discharge path 155A, and when the mixed solution is recovered from the circulation flow path 51, air is introduced from the introduction path 154B; however, description thereof is omitted below.

The circulation flow path S2 includes valves V69 and V70 that are provided to interpose the shared flow path 162. An introduction path 156A to which a diluting solution is introduced, an introduction path 156B to which air is introduced when the mixed solution is recovered, a discharge path 157A through which the diluting solution SB is discharged when the diluting solution SB is introduced via the introduction path 156A, and a recovery path 157B that recovers the mixed solution of the undiluted solution and the diluting solution are connected to the circulation flow path S2. When the diluting solution SB is introduced to the circulation flow path S2, the diluting solution SB is discharged from the discharge path 157A, and when the mixed solution is recovered from the circulation flow path S2, air is introduced from the introduction path 156B; however, description thereof is omitted below.

Subsequently, a method of mixing the undiluted solution SA with the diluting solution SB using the fluidic device 1 having the above configuration is described.

First, as shown in FIG. 11, the valves V71 and V72 in the first flow path 110 are opened, the valves V61 and V62 in the circulation flow path M are closed, the valves V63 and V64 are opened, and the undiluted solution SA is introduced from the first flow path 110 to a flow path at a side where the distance between the valves V61 and V62 is short. Further, the diluting solution SB is introduced from the introduction path 152A to a flow path at a side where the distance between the valves V61 and V62 is long in the circulation flow path M.

Figure 12:
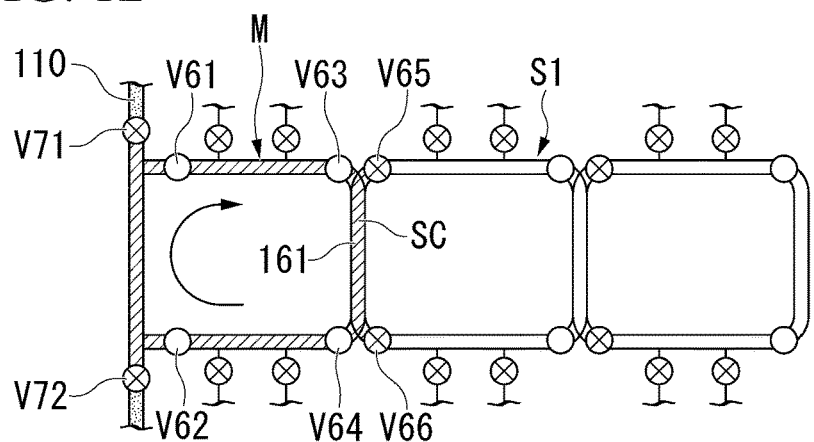
FIG. 12 is a plan view schematically showing a mixing method according to an embodiment.

Next, as shown in FIG. 12, by driving the pump after closing the valves V71 and V72 in the first flow path 110 and opening the valves V61 and V62 in the circulation flow path M, the undiluted solution SA and the diluting solution SB are circulated and mixed in the circulation flow path M, and thereby, a solution SC having a concentration that is smaller than that of the undiluted solution SA is formed.

Here, in the circulation flow path M, when the volume (the volume of the flow path at the side where the distance between the valves V61 and V62 is short in the circulation flow path M) between the valves V61 and V62 where the undiluted solution SA is accommodated is VL1, the volume (the volume of the flow path that includes the valves V63 and V64 where the distance between the valves V61 and V62 is long in the first circulation flow path M) between the valves V61 and V62 where the diluting solution SB is accommodated is VL2, and a dilution ratio of the undiluted solution SA is 1/Na, the following Equation (1) is satisfied.

$$1/Na = VL1/(VL1+VL2) \quad (1)$$

Accordingly, in the circulation flow path M including the shared flow path 161, a solution SC in which the undiluted solution SA is diluted at a dilution ratio of 1/Na is accommodated.

Figure 13:
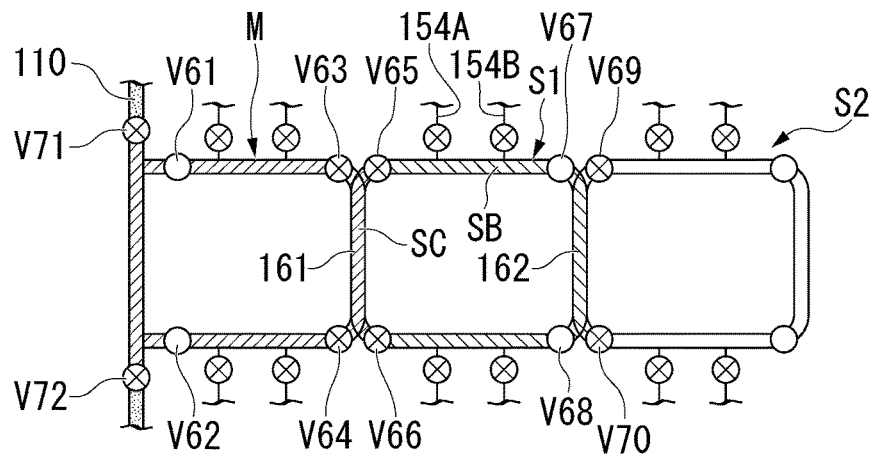
FIG. 13 is a plan view schematically showing the mixing method according to the embodiment.

Next, as shown in FIG. 13, the valves V63 and V64 in the circulation flow path M are closed. Thereby, the shared flow path 161 that accommodates the solution SC in which the undiluted solution SA is diluted at a dilution ratio of 1/Na is separated from the circulation flow path M. Then, in a state where the valves V69 and V70 in the circulation flow path S2 are closed, and the valves 67 and V68 in the circulation flow path 51 are opened, the diluting solution SB is introduced from the introduction path 154A to a non-shared flow path excluding the shared flow path 161 in the circulation flow path S1.

Figure 14:
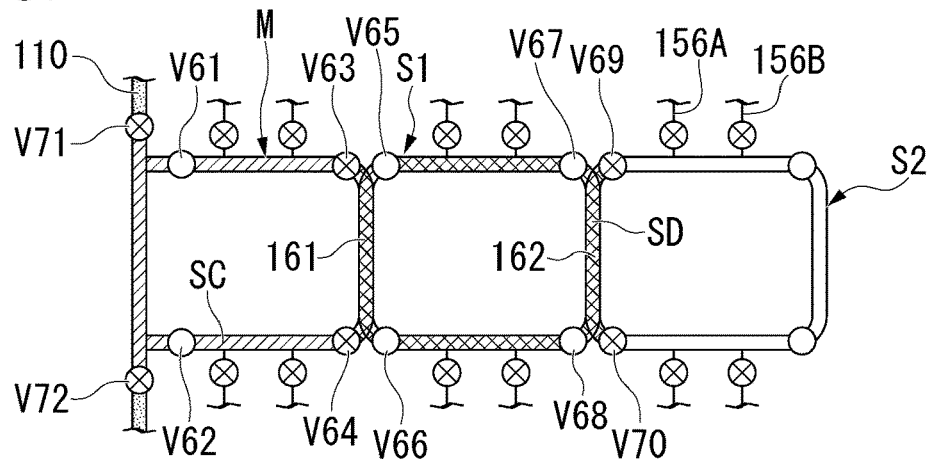
FIG. 14 is a plan view schematically showing the mixing method according to the embodiment.

Next, as shown in FIG. 14, by driving the pump after opening the valves V65 and V66 in the circulation flow path S1, the solution SC accommodated in the shared flow path 161 and the diluting solution SB accommodated in the non-shared flow path are circulated and mixed in the circulation flow path S1, and thereby, a solution SD in which the concentration of the undiluted solution SA is smaller than that of the solution SC is formed.

Here, in the circulation flow path S1, when the volume of the shared flow path 161 is VL3, the volume of the non-shared flow path excluding the shared flow path 161 is VL4, and the dilution ratio of the solution SC is Nb, the following Equation (2) is satisfied.

$$1/Nb = VL3/(VL3+VL4) \quad (2)$$

Since in the solution SC, the dilution ratio of the undiluted solution SA is 1/Na, a dilution ratio 1/Nc of the undiluted solution SA in the solution SD is shown by the following Equation (3).

$$1/Nc = (1/Na) \times (1/Nb) \quad (3)$$

Accordingly, in the circulation flow path S1 including the shared flow path 162, the solution SD in which the undiluted solution SA is diluted at a dilution ratio of 1/Nc is accommodated.

Figure 15:
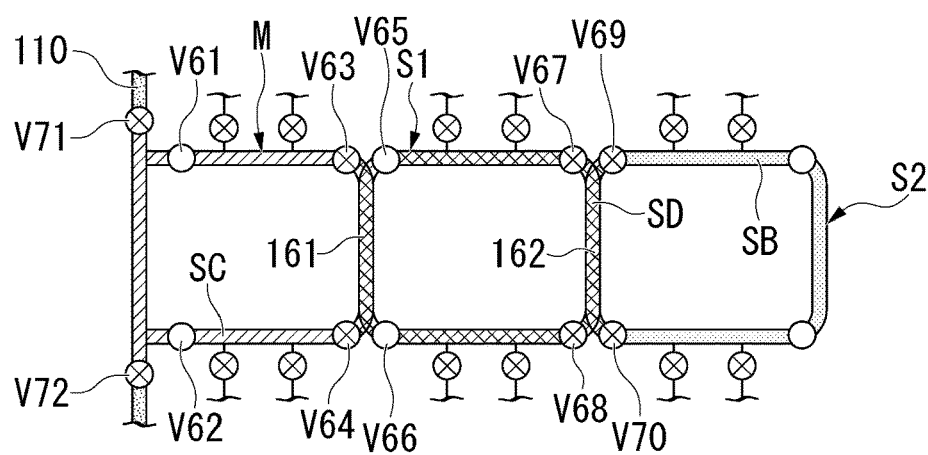
FIG. 15 is a plan view schematically showing the mixing method according to the embodiment.

Next, as shown in FIG. 15, the valves V67 and V68 in the circulation flow path S1 are closed. Thereby, the shared flow path 162 that accommodates the solution SD in which the undiluted solution SA is diluted at a dilution ratio of 1/Nc is separated from the circulation flow path S1. Then, in a state where the valves V69 and V70 in the circulation flow path S2 are closed, the diluting solution SB is introduced from the introduction path 156A to a non-shared flow path excluding the shared flow path 162 in the circulation flow path S2.

Figure 16:
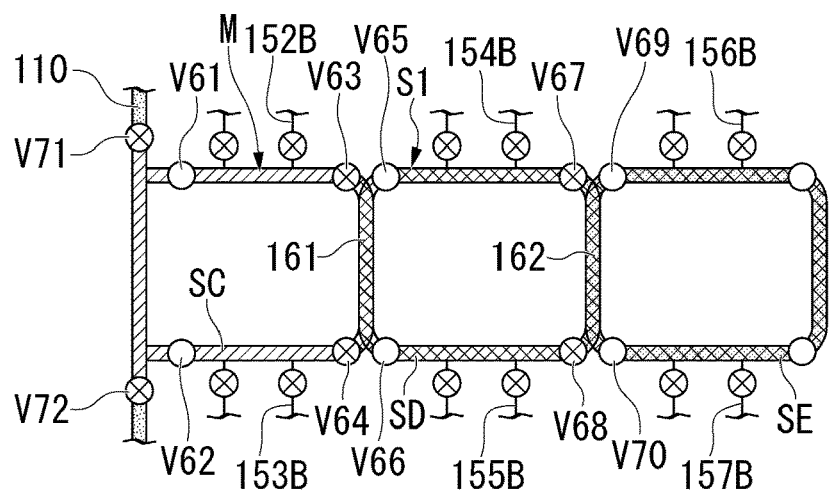
FIG. 16 is a plan view schematically showing the mixing method according to the embodiment.

Next, as shown in FIG. 16, by driving the pump after opening the valves V69 and V70 in the circulation flow path S2, the solution SD accommodated in the shared flow path 162 and the diluting solution SB accommodated in the non-shared flow path are circulated and mixed in the circulation flow path S2, and thereby, a solution SE in which the concentration of the undiluted solution SA is smaller than that of the solution SD is formed.

In the circulation flow path S2, when the volume of the shared flow path 162 is VL5, the volume of the non-shared flow path excluding the shared flow path 162 is VL6, and the dilution ratio of the solution SD in the circulation flow path S2 is Nd, the following Equation (4) is satisfied.

$$1/Nd = VL5/(VL5+VL6) \quad (4)$$

Since in the solution SD, the dilution ratio of the undiluted solution SA is 1/Nc (=(1/Na)×(1/Nb)) from Equation (3), a dilution ratio 1/Ne of the undiluted solution SA in the solution SE is shown by the following Equation (5).

$$1/Ne = (1/Na) \times (1/Nb) \times (1/Nd) \quad (5)$$

Accordingly, in the circulation flow path S2 including the shared flow path 162, the solution SE in which the undiluted solution SA is diluted at a dilution ratio of 1/Ne is accommodated.

In this way, in the fluidic device 1, the solution SC in which the undiluted solution SA is diluted at the dilution ratio of 1/Na is accommodated in the circulation flow path M, the solution SD in which the undiluted solution SA is diluted at the dilution ratio of 1/Nc (=(1/Na)×(1/Nb)) is accommodated in the circulation flow path S1, and the solution SE in which the undiluted solution SA is diluted at the dilution ratio of 1/Ne (=(1/Na)×(1/Nb)×(1/Nd)) is accommodated in the circulation flow path S2.

Then, the solution SC is recovered from the recovery path 153B, the solution SD is recovered from the recovery path 155B, and the solution SE is recovered from the recovery path 157B.

As described above, in the fluidic device 1 of the present embodiment, since the solution SC in which the undiluted solution SA is diluted in the circulation flow path M is a target of dilution in the circulation flow path S1, and the solution SD diluted in the circulation flow path S1 is a target of dilution, it is possible to easily dilute the undiluted solution SA at a high ratio compared to the configuration in which the dilution is performed in parallel as described in the first embodiment.

[Third Embodiment of Fluidic Device 1]

Next, a third embodiment of the fluidic device 1 is described with reference to FIG. 17.

In these drawings, the same elements as the constituent elements of the first embodiment and the second embodiment shown in FIG. 1 to FIG. 16 are denoted by the same reference numerals, and description thereof will be omitted.

The third embodiment is described using a configuration in which the second flow paths 120A to 120D of a parallel dilution type described in the first embodiment is combined with a circulation flow path of a step dilution type that uses a solution in which the undiluted solution is diluted described in the second embodiment as a target of dilution.

Figure 17:
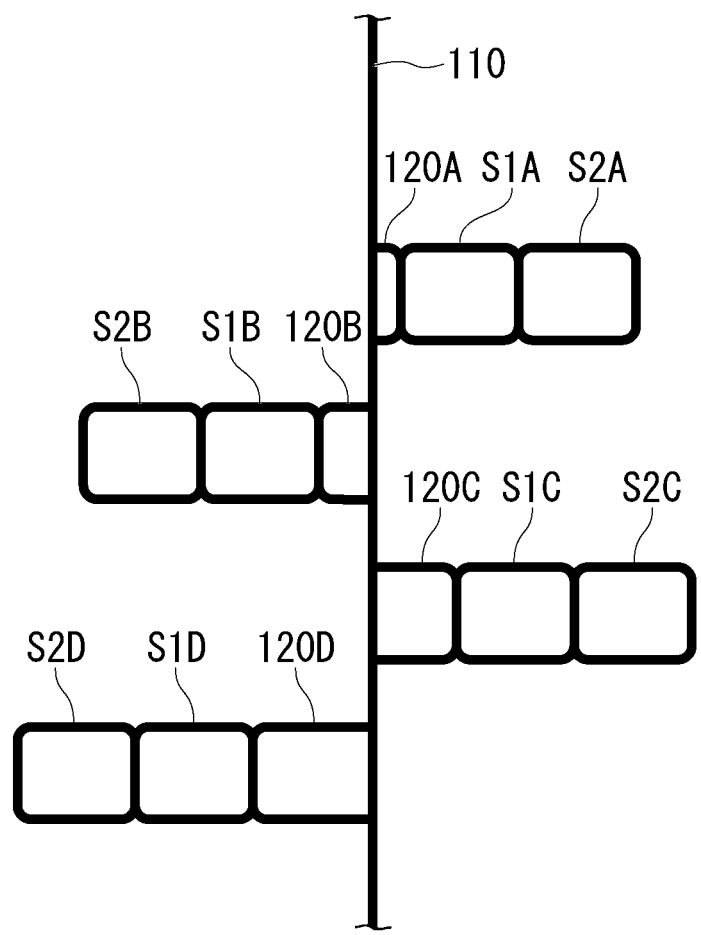
FIG. 17 is a plan view schematically showing a fluidic device according to an embodiment.

FIG. 17 is a plan view schematically showing a fluidic device 1 according to the third embodiment.

As shown in FIG. 17, the fluidic device 1 includes a first flow path 110 and second flow paths 120A to 120D described above each of which shares part of the first flow path 110. Circulation flow paths S1 and S2 that use a solution which is accommodated in a shared flow path with a preceding flow path and in which an undiluted solution is diluted as a target of dilution and that are capable of being partially compartmentalized as an undiluted solution supply part to a subsequent flow path are provided in each of the second flow paths 120A to 120D. In FIG. 17, the last symbol in the second flow paths 120A to 120D is attached to the end of the symbol of the circulation flow path S1 and S2.

Each of the circulation flow paths S1 and S2 provided in each of the second flow paths 120A to 120D dilutes an introduced solution to 1/16 (1/2⁵). [Table 2] shows dilution ratios in the second flow paths 120A to 120D and the circulation flow paths S1A to S1D and S2A to S2D.

TABLE 2

|  |  | Dilution ratio | | |
|---|---|---|---|---|
|  |  | Second flow path 120 | Second circulation flow path S1 | Second circulation flow path S2 |
| Group | A | $1/2^1$ | $1/2^5$ | $1/2^9$ |
|  | B | $1/2^2$ | $1/2^6$ | $1/2^{10}$ |
|  | C | $1/2^3$ | $1/2^7$ | $1/2^{11}$ |
|  | D | $1/2^4$ | $1/2^8$ | $1/2^{12}$ |

In the present embodiment, instead of the circulation flow path M shown in the second embodiment described above, by providing the second circulation flow paths S1 and S2 in the second flow paths 120A to 120D shown in the first embodiment, as shown in [Table 2], it is possible to easily obtain solutions (mixed solutions) in each of which the undiluted solution is diluted over a wide range of dilution ratios of $1/2^1$ to $1/2^{12}$.

[System]

Next, a system SYS that includes the above-mentioned fluidic device 1 is described with reference to FIG. 18 and FIG. 19.

Figure 18:
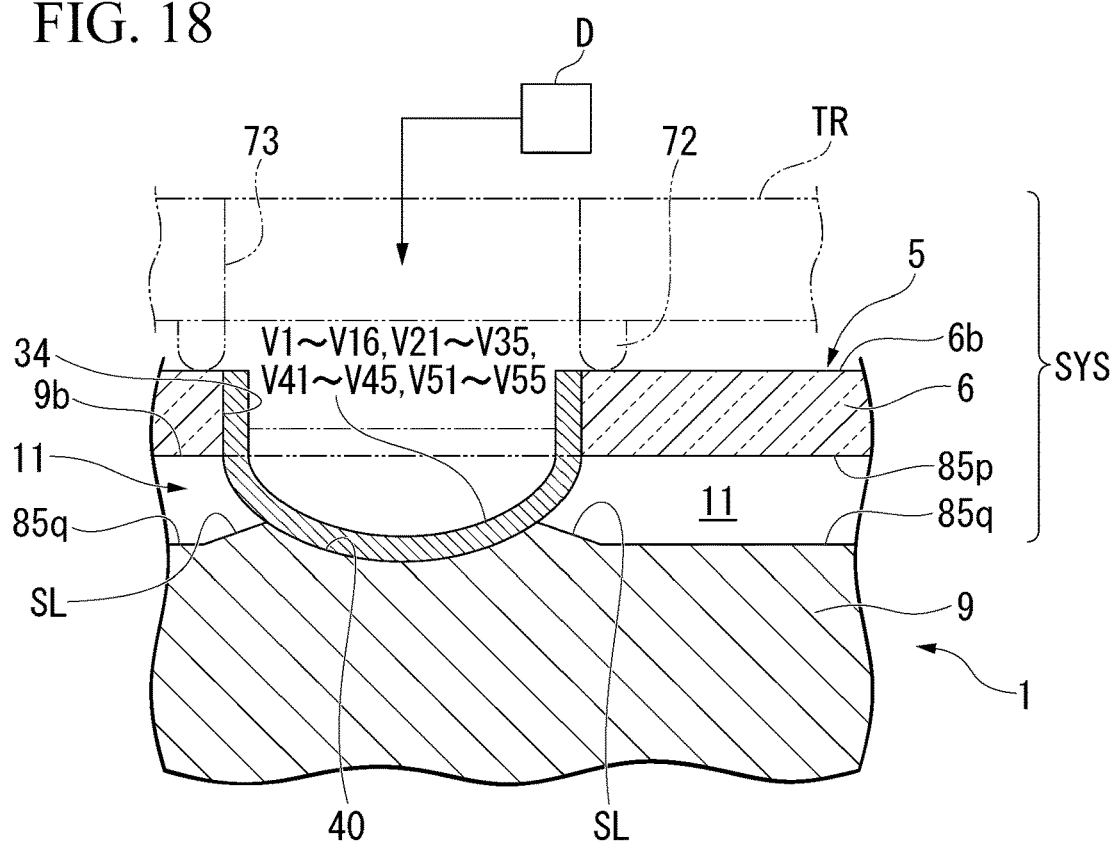
FIG. 18 is a cross-sectional view showing a basic configuration of a system SYS according to an embodiment.

FIG. 18 is a cross-sectional view showing a basic configuration of the system SYS.

As shown in FIG. 18, the system SYS includes the above-mentioned fluidic device 1 and a drive part TR. The fluidic device 1 is used by being set to the drive part TR. The drive part TR is formed in a plate shape and is arranged to face the upper surface 6b of the first base material when the fluidic device 1 is set. The drive part TR has a contact portion 72 that comes into contact with the upper surface 6b of the first base material 6 when the fluidic device 1 is set. The contact portion 72 is formed in an annular shape that surrounds the valve holding hole 34. When the contact portion 72 is in contact with the upper surface 6b of the first base material 6, the contact portion 72 can seal a space between the contact portion 72 and the upper surface 6b in an airtight manner.

The drive part TR has a drive fluid supply hole (supply part) 73 that supplies a drive fluid to the valves V1 to V16 and V21 to V22 of the fluidic device 1. The drive fluid (for example, air) is supplied to the drive fluid supply hole 73 from a fluid supply source D. The drive fluid is a force that deforms the valves V1 to V16, V21 to V35, V41 to V45, and V51 to V55. Further, the drive part TR has a second supply part (not shown) that is able to supply a force for driving the element pumps Pe of the second flow paths 120A to 120E via the supply paths arranged along the straight lines L1 to L3 shown in FIG. 2.

Figure 19:
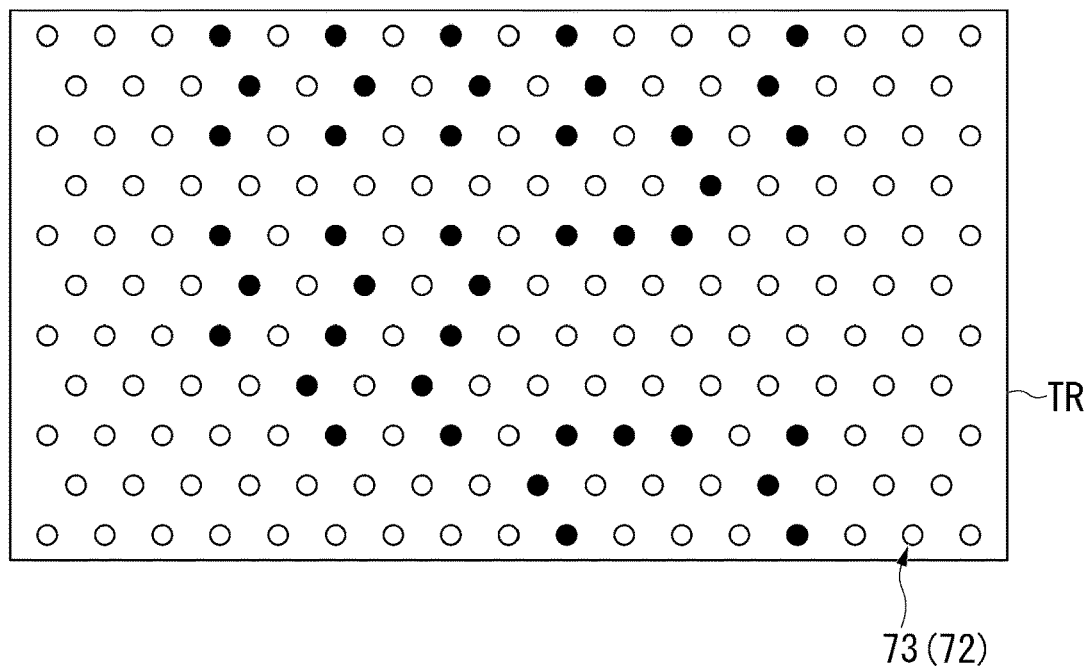
FIG. 19 is a plan view showing a drive part TR of the system SYS according to the embodiment.

FIG. 19 is a plan view of the drive part TR. As shown in FIG. 19, the drive part TR has a plurality of contact portions 72 and drive fluid supply holes 73. The drive fluid can be independently supplied to each drive fluid supply hole 73 from the fluid supply source D. A predetermined number (182 in FIG. 19) of the contact portions 72 and the drive fluid supply holes 73 are arranged in a two-dimensional hexagonal lattice pattern. The center positions of the valves V1 to V16, V21 to V35, V41 to V45, and V51 to V55 in the fluidic device 1 described above are arranged at a position (position shown in black in FIG. 19) selected from the contact portions 72 and the drive fluid supply holes 73 arranged in a two-dimensional hexagonal lattice pattern.

In the system SYS having the configuration described above, the fluidic device 1 is set to the drive part TR, the drive fluid is supplied from the fluid supply source D in response to the opening and closing of the valves V1 to V16, V21 to V35, V41 to V45, and V51 to V55 described above, and thereby, it is possible to perform introduction of the solution SA to the first flow path 110 (quantification parts GA to GE), introduction of the solution SB to the second flow path 120A excluding the quantification part GA, and mixing of the solutions SA and SB in the second flow path 120A.

In the system SYS of the present embodiment, by arranging the valves V1 to V16, V21 to V35, V41 to V45, and V51 to V55 of the fluidic device 1 at a position selected from the contact portions 72 and the drive fluid supply holes 73 arranged in the two-dimensional hexagonal lattice pattern, as described above, it is possible to easily provide the merging/branching portion surrounded by a contour parallel to the line segment connecting together the apex positions of the equilateral triangle. Therefore, in the system SYS of the present embodiment, it is possible to design an optimal flow path capable of preventing air bubbles from being generated when the solution is introduced in accordance with the measurement (inspection) target without being limited to the arrangement and number of the flow paths 11 and the merging/branching portions in the fluidic device 1.

Although the preferred embodiments according to the present invention have been described above with reference to the accompanying drawings, the present invention is not limited to such examples. Various shapes, combinations, and the like of each constituent member shown in the above-described examples are examples and can be variously changed on the basis of design requirements and the like without departing from the gist of the present invention.

For example, the above embodiment is described using a configuration in which the annular second flow paths 120A to 120E are provided along a plane that is substantially parallel to the YZ plane; however, the embodiment is not limited to such a configuration. For example, a configuration may be employed in which the second flow paths 120A to 120E are provided along a plane that is substantially parallel to the XY plane.

The arrangement and number of the flow paths, the merging/branching portions, and the valves shown in the above embodiment are examples, and as described above, by arranging the valve (and the merging/branching portion, and the flow path) of the fluidic device 1 at a position selected from the contact portions 72 and the drive fluid supply holes 73 arranged in a two-dimensional hexagonal lattice pattern, it is possible to easily cope with various measurement (inspection) targets.

Further, for example, the first embodiment is described using a configuration in which five second flow paths 120A to 120E having part of the first flow path 110 as a shared part are provided; however, the number of the second flow paths may be two or more. Further, the second embodiment and the third embodiment are described using a configuration in which two second circulation flow paths as an auxiliary flow path are provided; however, a configuration may be employed in which three or more second circulation flow paths are provided.

Further, the above embodiment is described using a configuration in which the contour of the merging/branching portion is parallel to the line segment connecting together the apex positions of the equilateral triangle where the center positions of the valves V1 to V16, V21 to V35, V41 to V45, and V51 to V55 are arranged; however, the embodiment is not limited to such a configuration. For example, a configuration may be employed in which the contour is a line segment connecting together the apex positions.

Further, the above embodiment is described using a configuration in which the first part 121 of the second flow paths 120A to 120E is provided on the upper surface 9b of the second substrate 9, and the second part 122 is provided on the lower surface 9a of the second substrate 9; however, the embodiment is not limited to such a configuration. For example, a configuration in which the first part 121 is provided on the lower surface 6a of the first substrate 6, or a configuration in which the first part 121 straddles the first boundary surface 61 and is provided on both the upper surface 9b of the second substrate 9 and the lower surface 6a of the first substrate 6 may be employed. Further, a configuration in which the second part 122 is provided on the upper surface 8b of the third substrate 8, or a configuration in which the second part 122 straddles the second boundary surface 62 and is provided on both the lower surface 9a of the second substrate 9 and the upper surface 8b of the third substrate 8 may be employed. When the groove part serving as a flow path is provided on only one substrate, processing and alignment between the substrates are easy.

Figure 20:
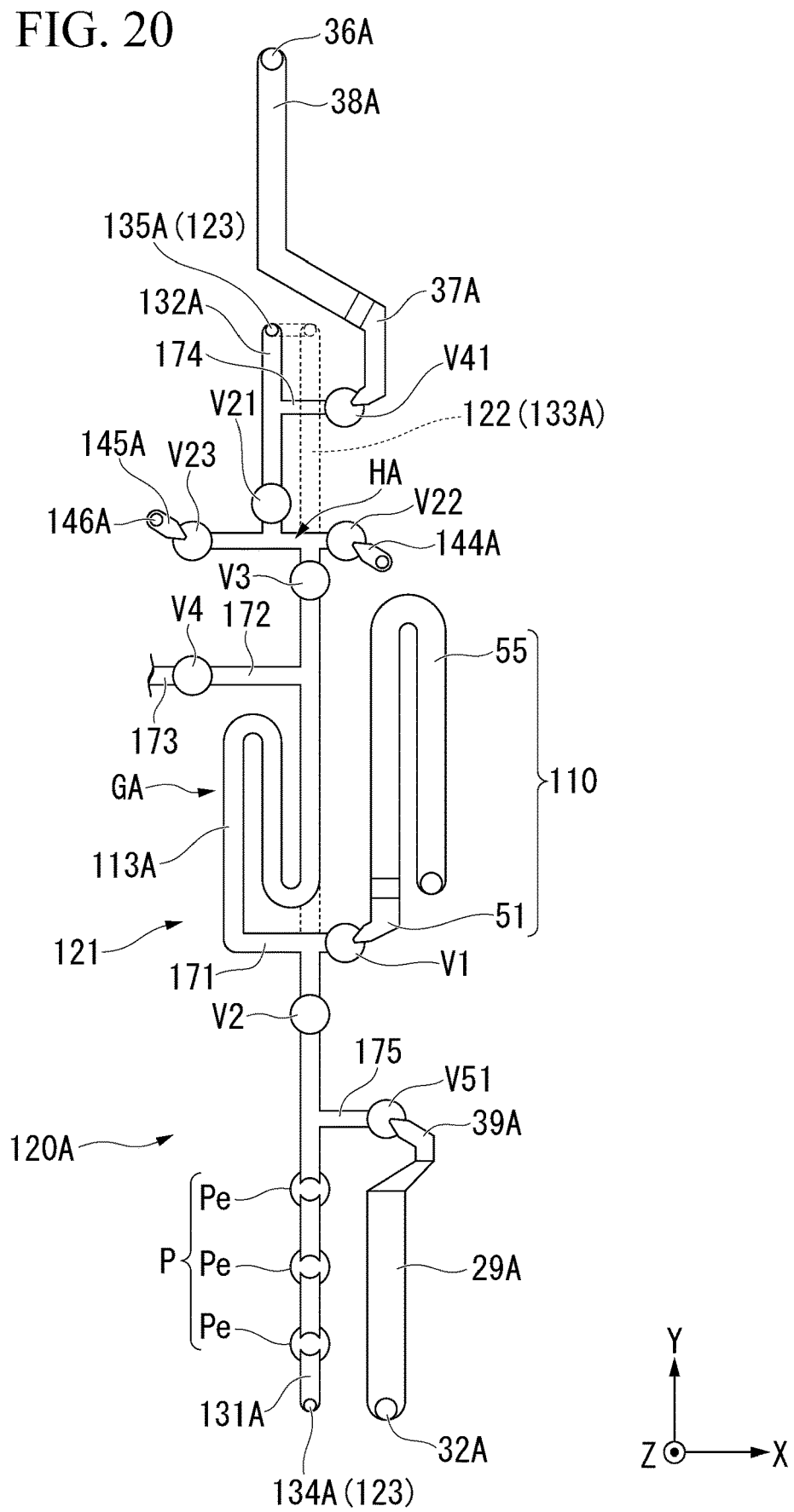
FIG. 20 is a partial plan view showing a modified example of a first flow path 110 and second flow paths 120A to 120E.

Further, the above embodiment is described using a configuration in which the first flow path 110 and the second flow paths 120A to 120E have a merging/branching portion surrounded by a contour parallel to each line segment connecting together the apex positions of the equilateral triangle; however, the embodiment is not limited to such a configuration. FIG. 20 is a partial plan view showing a modified example in which merging or branching of a solution are performed in a linear flow path in the first flow path 110 and the second flow path 120A shown as a representative among the second flow paths 120A to 120E.

As shown in FIG. 20, in the first flow path 110, an introduction flow path 171 connecting together a valve V1 and a connection portion 113A and an introduction flow path 172 connecting together a valve V4 and the connection portion 113A are provided. The introduction flow path 172 is connected via the valve V4 to an introduction flow path 173 that constitutes a quantification part GB. The connection portion 113A and the introduction flow paths 171 and 172 are consisted of a groove part formed in a linear shape. A quantification part GA is formed between a valve V2 and the valve V4.

A quantification part HA in the second flow path 120A is formed of a linear groove part extending in the X direction arranged between valves V22 and V23. A +Y side end section of the connection portion 113A and a −Y side end section of an upper surface flow path 132A are connected to the quantification part HA. The connection portion 113A and the upper surface flow path 132A that constitute a first part 121 are arranged to be separated from each other in the X direction.

A valve V3 is arranged in the vicinity of an intersection with the quantification part HA in the connection portion 113A. The valve V1 is arranged in the vicinity of an intersection with the quantification part HA in the upper surface flow path 132A. A linear discharge flow path 174 of which one end is connected to a valve V41 is connected to the upper surface flow path 132A between a connection hole 135A and a valve V21.

The valve V2 is arranged in the upper surface flow path 131A in the vicinity of an intersection with the introduction flow path 171. A linear introduction flow path 175 of which one end is connected to a valve V51 is connected to the upper surface flow path 131A between the pump P and the valve V2.

A lower surface flow path 133A that constitutes the first part 122 has the same position in the X direction as the upper surface flow path 131A and is arranged to overlap the upper surface flow path 131A in the lamination direction. The connection hole 135A penetrates through the second substrate 9 obliquely relative to the lamination direction (is inclined about the Y axis with respect to the Z axis) and connects together +Y side end parts of the upper surface flow path 132A and the lower surface flow path 133A. The second flow path 120A excluding the quantification part HA is formed in a plane substantially parallel to the YZ plane.

Other second flow paths 120B to 120E have the same configuration as the second flow path 120A.

In the modified example of the fluidic device 1, as described above, in a state where the valves V2 and V3 are closed, and the valves V1 and V4 are opened, by closing the valves V1 and V4 after the solution SA is introduced to the first flow path 110, a predetermined amount of solution SA is quantified in the quantification part GA.

Next, in a state where the valves V1 to V4, V22, and V41 are closed, and the valves V21, V23, and V51 are opened, the solution SB is sequentially introduced to the upper surface flow path 131A, the connection hole 134A, the lower surface flow path 133A, the connection hole 135A, the upper surface flow path 132A, and the quantification part HA via the introduction flow path 175. Next, by closing the valves V23 and V51, a region (non-shared part) of the second flow path 120A excluding the quantification part GA is partitioned, and the solution SB is quantified.

Then, in a state where the solution SA is quantified in the quantification part GA, and the solution SB is quantified in the second flow path 120A excluding the quantification part GA, the solutions SA and SB in the second flow path 120A are sent and circulated using the pump P. In this way, the solutions SA and SB can be mixed by the small fluidic device 1 in which the second flow paths 120A to 120E and the first flow path 110 formed of a linear groove part are formed in a plane substantially parallel to the YZ plane.

DESCRIPTION OF THE REFERENCE SYMBOLS

1 Fluidic device
6 First substrate

8 Third substrate
9 Second substrate
11 Flow path
39A to 39E Supply path (diluting solution introduction port)
51 Introduction path (undiluted solution introduction port)
73 Drive fluid supply hole (supply part)
110 First flow path (undiluted solution introduction flow path)
120, 120A to 120E Second flow path (first circulation flow path)
121 First portion
122 Second portion
123 Third portion
GA to GE Quantification part (shared part)
111A, 112A Merging/branching portion
113A Connection portion
145A Discharge path (diluting solution discharge port)
161, 162 Shared flow path (shared part)
M Circulation flow path (first circulation flow path)
Pe Element pump (drive valve)
51, S2 Circulation flow path (third circulation flow path)
SA First solution (undiluted solution)
SB Second solution (diluting solution)
TR Drive part
V1 to V16, V22 to V35, V41 to V45, V51 to V55 Valve

The invention claimed is:

1. A fluidic device, comprising:
a first substrate, a second substrate, and a third substrate which are stacked in a thickness direction;
an undiluted solution introduction flow path which has an undiluted solution introduction port and which includes a first part having a first groove part provided on at least one of the first substrate or the second substrate;
a second part which includes a second groove part provided on at least one of the second substrate or the third substrate;
a third part which includes a third groove part provided on the second substrate along with the thickness direction and that that connects together the first part and the second part at each of positions at both end sides;
a first circulation flow path which includes a groove part having an annular shape and having: a first shared part that shares a part of a flow path with the undiluted solution introduction flow path; and a first non-shared part which is not shared with the undiluted solution introduction flow path and which is connected to a diluting solution introduction port; and
a second circulation flow path which is provided independently of the first circulation flow path and which includes a groove part having an annular shape and having: a second shared part that shares a part of the flow path with the undiluted solution introduction flow path; and a second non-shared part which is not shared with the undiluted solution introduction flow path and which is connected to the diluting solution introduction port,
wherein the undiluted solution introduction flow path comprises a plurality of valves wherein the first shared part is connected to the second shared part via a connection valve of the plurality of the valves, and
in the first circulation flow path and the second circulation flow path, a volume ratio of the first shared part and the first non-shared part is different from a volume ratio of the second shared part and the second non-shared part,
the third substrate is stacked on the second substrate at an opposite side of the first substrate,
and further wherein
the first and/or second non-shared part includes:
the first part that includes the first groove part which is provided on at least one of the first substrate or the second substrate and which is connected to the first and/or second shared part;
the second part that includes the second groove part which is provided on at least one of the second substrate or the third substrate;
and the third part penetrates through the second substrate in the thickness direction and that connects together the first part and the second part at each of positions at both end sides.

2. The fluidic device according to claim 1,
wherein the first and/or second non-shared part is connected to a diluting solution discharge port.

3. The fluidic device according to claim 2,
wherein the diluting solution introduction port is connected to the first and/or second non-shared part in a vicinity of a first valve at one end of the shared part, and the diluting solution discharge port is connected to the first and/or second non-shared part in a vicinity of a second valve at one end of the shared part.

4. The fluidic device according to claim 1, additionally comprising a third circulation flow path including a groove part having an annular shape and having: a shared flow path that shares a part of a flow path with the first circulation flow path; and a non-shared flow path which is not shared with the first circulation flow path and which is connected to the diluting solution introduction port,
wherein the non-shared flow path is connected to a diluting solution discharge port.

5. The fluidic device according to claim 4,
wherein a first valve is provided on one end of the shared flow path and a second valve is provided on another end of the shared flow path, and
the diluting solution introduction port is connected to the non-shared flow path in a vicinity of the first valve at one end of the shared flow path, and the diluting solution discharge port is connected to the non-shared flow path in a vicinity of the second valve at another end of the shared flow path.

6. The fluidic device according to claim 1,
wherein the first part and the second part at least partially overlap each other when viewed in a direction parallel to the thickness direction of the stacked first, second, and third substrates.

7. The fluidic device according to claim 1, comprising a quantification part capable of diverting, with a use of a first valve, the first and/or second shared part to part of the undiluted solution introduction flow path or part of the first circulation flow path.

8. The fluidic device according to claim 7,
wherein the first valve adjusts a flow of solution in the flow path.

9. The fluidic device according to claim 1,
wherein at least one of the first or second shared parts or at least one of the first or second non-shared part includes a quantification part that is able to quantify a solution to a predetermined volume,
the quantification part includes:
a pair of merging or branching portions each of which is surrounded by a contour that matches each of line segments connecting together apex positions of an equilateral triangle in a view of the thickness direction or a contour parallel to each of the line segments and at which merging or branching of the solution is performed; and a connection portion that connects together the pair of merging or branching portions via one of the apex positions in the pair of merging or branching portions, and a regulating valve which regulates a fluid flow in the flow path is provided at one of the apex positions in the merging or branching portion at which the connection portion is not arranged.

10. The fluidic device according to claim 9,
wherein in the quantification part between the first circulation flow path and the second circulation flow path, volumes of the pair of merging or branching portions are equal to each other, and a volume of the connection portion is set in accordance with the volume ratio.

11. The fluidic device according to claim 10, further comprising: a partitioned third circulation flow path; and
at least one auxiliary flow path which includes part of the partitioned third circulation flow path as an undiluted solution supply part, to which a solution including the diluting solution is capable of being introduced, and which is provided in an annular shape independently of the first circulation flow path.

12. The fluidic device according to claim 11, further comprising
more than one of the auxiliary flow paths, the auxiliary flow paths being sequentially positioned and each of which being capable of being individually partitioned as an undiluted solution supply part.

13. The fluidic device according to claim 1,
wherein the undiluted solution introduction flow path and the first circulation flow path include an adjustment valve that adjusts a flow of fluid, and
a center position of the valve is arranged at each of positions selected from a predetermined number of index points arranged in a two-dimensional hexagonal lattice pattern.

14. The fluidic device according to claim 1,
wherein the first circulation flow path and the second circulation flow path include a predetermined number of drive valves that operate in cooperation with each other and that adjust a flow of fluid in the second circulation flow path, and
each of the predetermined number of drive valves is arranged in a straight line that extends over the first circulation flow path and the second circulation flow path.

15. A system comprising:
the fluidic device according to claim 1; and
at least one supply part capable of supplying a force that deforms a drive valve which adjusts a flow of fluid in a flow path when set to the fluidic device.

16. The system according to claim 15, further comprising more than one supply part,
wherein a predetermined number of the supply parts are arranged in a two-dimensional hexagonal lattice pattern, and
the valve is arranged at a position selected from the predetermined number of supply parts arranged in the two-dimensional hexagonal lattice pattern.

17. A system comprising:
the fluidic device according to claim 16; and
a supply part capable of supplying a force that collectively deforms at least one of the drive valves arranged on a straight line over the first circulation flow path and the second circulation flow path via a supply path arranged along the straight line.

* * * * *